United States Patent
Hashiya et al.

(10) Patent No.: US 12,147,094 B2
(45) Date of Patent: Nov. 19, 2024

(54) OPTICAL DEVICE AND PHOTODETECTION SYSTEM

(71) Applicant: Panasonic Intellectual Property Management Co., Ltd., Osaka (JP)

(72) Inventors: Akira Hashiya, Osaka (JP); Yasuhisa Inada, Osaka (JP); Kazuki Nakamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 204 days.

(21) Appl. No.: 17/807,741

(22) Filed: Jun. 20, 2022

(65) Prior Publication Data

US 2022/0317481 A1 Oct. 6, 2022

Related U.S. Application Data

(63) Continuation of application No. PCT/JP2020/047885, filed on Dec. 22, 2020.

(30) Foreign Application Priority Data

Jan. 24, 2020 (JP) .................. 2020-010144

(51) Int. Cl.
*G02F 1/01* (2006.01)
*F21V 8/00* (2006.01)
*G01S 7/481* (2006.01)

(52) U.S. Cl.
CPC ............ *G02F 1/011* (2013.01); *G01S 7/4814* (2013.01); *G02B 6/0018* (2013.01); *G02B 6/0078* (2013.01)

(58) Field of Classification Search
CPC .................................................. G02F 1/00118
See application file for complete search history.

(56) References Cited

U.S. PATENT DOCUMENTS 10,488,498 B2 * 11/2019 Inada .................... G02B 6/0016
10,534,204 B2 * 1/2020 Horst ...................... G02F 1/017
(Continued)

FOREIGN PATENT DOCUMENTS

| JP | 2013-016591 | 1/2013 |
| JP | 2016-508235 | 3/2016 |

(Continued)

OTHER PUBLICATIONS

EPC Office Action dated Jun. 13, 2023 for the related European Patent Application No. EP20916073.8.
(Continued)

*Primary Examiner* — Rhonda S Peace
(74) *Attorney, Agent, or Firm* — Rimon P.C.

(57) ABSTRACT

An optical device includes a plurality of optical waveguides, and a planar optical waveguide. The plurality of optical waveguides each extend in a first direction, and are arranged in a second direction intersecting the first direction. The planar optical waveguide is connected directly or indirectly with the plurality of optical waveguides. The plurality of optical waveguides each allow light to propagate in the first direction. The planar optical waveguide includes a first mirror and a second mirror, and an optical waveguide layer. The first mirror and the second mirror face each other, and extend in the first direction and the second direction. The optical waveguide layer is located between the first mirror and the second mirror.

14 Claims, 21 Drawing Sheets

(56) References Cited

U.S. PATENT DOCUMENTS

| | | | |
|---|---|---|---|
| 10,877,215 B2* | 12/2020 | Hashiya | G02B 26/06 |
| 2017/0371227 A1 | 12/2017 | Skirlo et al. | |
| 2018/0224709 A1* | 8/2018 | Inada | G02F 1/295 |
| 2018/0267150 A1* | 9/2018 | Inada | G02B 6/005 |
| 2018/0372951 A1* | 12/2018 | Hashiya | G01S 7/4817 |
| 2019/0004393 A1 | 1/2019 | Hashiya et al. | |
| 2019/0265574 A1 | 8/2019 | Skirlo et al. | |
| 2020/0363596 A1 | 11/2020 | Hashiya et al. | |
| 2020/0379314 A1 | 12/2020 | Hashiya et al. | |
| 2020/0408884 A1 | 12/2020 | Nakamura et al. | |
| 2022/0299605 A1* | 9/2022 | Soskind | G01S 7/484 |
| 2022/0317481 A1* | 10/2022 | Hashiya | G01S 7/4817 |

FOREIGN PATENT DOCUMENTS

| | | |
|---|---|---|
| JP | 2019-164329 | 9/2019 |
| JP | 2019-168647 | 10/2019 |
| JP | 2019-174358 | 10/2019 |
| WO | 2013/168266 | 11/2013 |
| WO | 2014/110017 | 7/2014 |
| WO | 2019/181214 | 9/2019 |
| WO | 2019/187777 | 10/2019 |

OTHER PUBLICATIONS

International Search Report of PCT application No. PCT/JP2020/047885 dated Mar. 16, 2021.

* cited by examiner

OPTICAL DEVICE AND PHOTODETECTION SYSTEM

BACKGROUND

1. Technical Field

The present disclosure relates to an optical device, and a photodetection system.

2. Description of the Related Art

Various devices capable of scanning a space with light have been proposed in the related art.

International Publication No. 2013/168266 discloses a configuration that enables optical scanning by use of a drive device that rotates a mirror.

Japanese Unexamined Patent Application Publication (Translation of PCT Application) No. 2016-508235 discloses an optical phased array with plural nano-photonic antenna elements arranged two-dimensionally. Each of the antenna elements is optically coupled with a variable optical delay line (i.e., a phase shifter). In the optical phased array, a coherent light beam is guided by a waveguide to each antenna element, and shifted in phase by the phase shifter. This makes it possible to change the amplitude distribution of the far-field pattern.

Japanese Unexamined Patent Application Publication No. 2013-016591 discloses an optical deflection element including a waveguide, an incidence opening, and an emission opening. The waveguide includes an optical waveguide layer in which light is guided, and a first distributed Bragg reflector disposed on the top and bottom sides of the optical waveguide layer. The incidence opening is an opening through which light enters the waveguide. The emission opening is provided on a surface of the waveguide to allow emission, from the waveguide, of light entering through the incidence opening and propagating within the waveguide.

SUMMARY

One non-limiting and exemplary embodiment provides a novel optical device capable of achieving optical scanning by means of a relatively simple configuration.

In one general aspect, the techniques disclosed here feature an optical device including a plurality of optical waveguides, and a planar optical waveguide. The plurality of optical waveguides each extend in a first direction, and are arranged in a second direction intersecting the first direction. The planar optical waveguide is connected directly or indirectly with the plurality of optical waveguides. The plurality of optical waveguides each allow light to propagate in the first direction. The planar optical waveguide includes a first mirror and a second mirror, and an optical waveguide layer. The first mirror and the second mirror face each other, and extend in the first direction and the second direction. The optical waveguide layer is located between the first mirror and the second mirror.

An aspect of the present disclosure makes it possible to achieve one-dimensional optical scanning or two-dimensional optical scanning by means of a relatively simple configuration.

It should be noted that general or specific aspects of the present disclosure may be implemented as a device, a system, a method, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figure 1:
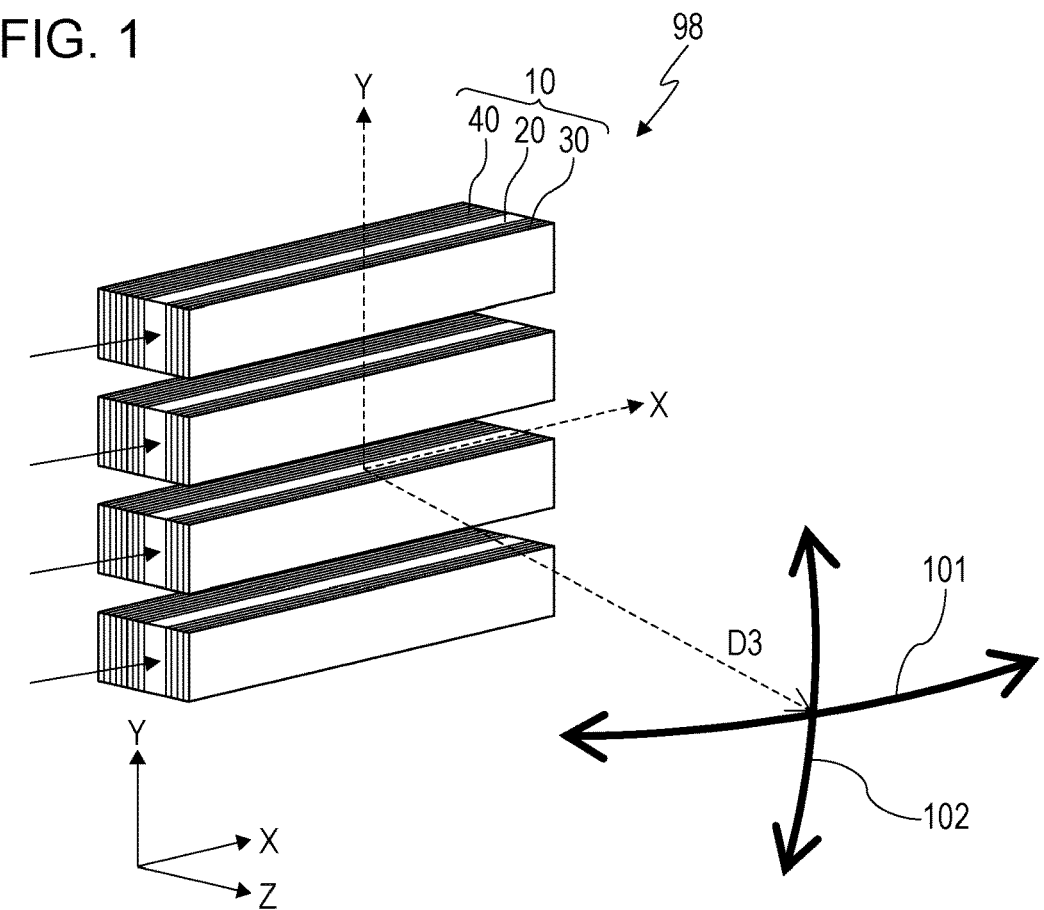
FIG. 1 is a schematic perspective view of an optical scanning device previously considered by the inventors.

Prior to describing embodiments of the present disclosure, the underlying knowledge forming the basis of the present disclosure is described below.

The inventors have found that existing optical scanning devices do not readily allow scanning of a space with light without adding complexity to their configuration.

For example, the technique disclosed in International Publication No. 2013/168266 requires a drive device for rotating a mirror. This adds complexity to the configuration of the device, and the resulting configuration is not robust against vibration.

The optical phased array described in Japanese Unexamined Patent Application Publication (Translation of PCT Application) No. 2016-508235 requires that light be split into rays that are introduced into plural column waveguides and plural row waveguides before being guided to plural antenna elements arranged in a two-dimensional array. This adds great complexity to the wiring of waveguides for guiding light. The above requirement also makes it impossible to increase the range of two-dimensional scanning. Further, to two-dimensionally change the amplitude distribution of emitted light in the far field, it is necessary to connect a phase shifter to each of the antenna elements in the two-dimensional array, and attach a phase control wire to each individual phase shifter. In this way, the respective phases of light rays entering the antenna elements in the two-dimensional array are changed by different amounts. This adds great complexity to the configuration of the elements.

With focus on the above-mentioned issues associated with the related art, the inventors have contemplated a configuration for addressing such issues. For comparison with embodiments of the present disclosure, reference is now made to a configuration previously contemplated by the inventors before arriving at embodiments of the present disclosure. This configuration includes a waveguide element. The waveguide element has a pair of mirrors facing each other, and an optical waveguide layer sandwiched between the mirrors.

Of the pair of mirrors of the waveguide element, one mirror has a higher light transmittance than the other. This causes a portion of light propagating in the optical waveguide layer to be emitted externally through the one mirror. As will be described later, the direction (or emission angle) of the emitted light can be changed by adjusting the refractive index or thickness of the optical waveguide layer, or the wavelength of light input to the optical waveguide layer. More specifically, changing the refractive index, the thickness, or the wavelength makes it possible to change a component constituting the wave vector of the emitted light and directed in the longitudinal direction of the optical waveguide layer. In this way, one-dimensional scanning is achieved.

Further, two-dimensional scanning can be achieved by using an array of plural waveguide elements. More specifically, by imparting an appropriate phase difference to light rays supplied to the waveguide elements, and adjusting the phase difference, the direction of constructive interference between light rays emitted from the waveguide elements can be changed. A change in phase difference causes a change in a component constituting the wave vector of the emitted light and directed in a direction that intersects the longitudinal direction of the optical waveguide layer. Two-dimensional scanning can be thus achieved. Performing two-dimensional scanning in this way does not require changing plural optical waveguide layers in refractive index, thickness, or wavelength of light by different amounts. That is, two-dimensional scanning can be performed by imparting an appropriate phase difference to light rays supplied to the optical waveguide layers, and synchronously changing each of the optical waveguide layers in at least one of refractive index, thickness, or wavelength by the same amount. In this way, two-dimensional optical scanning can be achieved by means of a relatively simple configuration.

As used herein, the expression "at least one of refractive index, thickness, or wavelength" means at least one selected from the group consisting of the refractive index of the optical waveguide layer, the thickness of the optical waveguide layer, and the wavelength of light input to the optical waveguide layer. To change the direction of light emission, any one of refractive index, thickness, or wavelength may be controlled alone. Alternatively, any two or all of the three variables may be controlled to change the direction of light emission. Instead of or in addition to controlling refractive index or thickness, the wavelength of light input to the optical waveguide layer may be controlled.

The basic principle described above is applicable not only to emission of light but also similarly to reception of light signals. One-dimensionally changing the direction of light that can be received is possible by changing at least one of refractive index, thickness, or wavelength. Furthermore, two-dimensionally changing the direction of light that can be received is possible by changing the phase difference between light rays by means of plural phase shifters each connected to the corresponding one of the waveguide elements arranged in one direction.

In the present disclosure, "scanning" with light means changing the direction of light. The term "one-dimensional scanning" means linearly changing the direction of light with respect to a direction intersecting the direction of light. The term "two-dimensional scanning" means two-dimensionally changing the direction of light along a plane intersecting the direction of light.

<Exemplary Configuration of Optical Scanning Device>

Reference is first made by way of example to a configuration of an optical scanning device previously contemplated by the inventors for performing two-dimensional scanning.

FIG. 1 is a schematic perspective view of an optical scanning device 98 previously contemplated by the inventors. The optical scanning device 98 includes a waveguide array with plural waveguide elements 10. Each of the waveguide elements 10 is shaped to extend in a first direction (X direction in FIG. 1). The waveguide elements 10 are arranged in a regular array in a second direction (Y direction in FIG. 1) intersecting the first direction. The waveguide elements 10 each allow light to propagate in the first direction while causing light to be emitted in a third direction D3 that intersects an imaginary plane parallel to the first and second directions. Although the first direction (X direction) and the second direction (Y direction) are orthogonal to each other according to embodiments of the present embodiment, the first and second directions may not be orthogonal to each other. Although the waveguide elements 10 are arranged at equal intervals in the Y direction according to embodiments of the present disclosure, the waveguide elements 10 may not necessarily be arranged at equal intervals.

For reference, an X axis, a Y axis, and a Z axis that are orthogonal to each other are schematically depicted. The direction in which an arrow representing each axis points is herein defined as a + direction, and the direction opposite to this direction is herein defined as a − direction. It is to be noted that the orientations of structural objects illustrated in the drawings of the present disclosure are set in consideration of the ease of explanation, which are in no way intended to limit the orientations of these structural objects in the actual implementation of embodiments of the present disclosure. Further, the shape and size of the whole or part of each individual structural object illustrated in the drawings are not intended to limit the actual shape and size.

Each of the waveguide elements 10 includes a first mirror 30 and a second mirror 40 (each of which will be hereinafter sometimes referred to simply as "mirror") that face each other, and an optical waveguide layer 20 located between the mirror 30 and the mirror 40. The mirror 30 and the mirror 40 each have, at its interface with the optical waveguide layer 20, a reflecting surface intersecting the third direction D3. The mirror 30, the mirror 40, and the optical waveguide layer 20 are shaped to extend in the first direction (X direction).

As will be described later, the respective first mirrors 30 of the waveguide elements 10 may be plural portions of a mirror of unitary construction. Further, the respective second mirrors 40 of the waveguide elements 10 may be plural portions of a mirror of unitary construction. Furthermore, the respective optical waveguide layers 20 of the waveguide elements 10 may be plural portions of an optical waveguide layer of unitary construction. Plural waveguides can be formed by at least (1) each first mirror 30 being constructed separately from another first mirror 30, (2) each second mirror 40 being constructed separately from another second mirror 40, or (3) each optical waveguide layer 20 being constructed separately from another optical waveguide layer 20. The expression "constructed separately" encompasses not only physically providing an intervening space but also separating the corresponding components from each other with a material of a different refractive index interposed therebetween.

The reflecting surface of the first mirror 30, and the reflecting surface of the second mirror 40 face each other in a substantially parallel fashion. Of the two mirrors 30 and 40, at least the first mirror 30 has the property of transmitting a portion of light propagating in the optical waveguide layer 20. In other words, the first mirror 30 has a higher light transmittance to the light than the second mirror 40. Consequently, a portion of light propagating in the optical waveguide layer 20 is emitted externally through the first mirror 30. Each of such mirrors 30 and 40 may be, for example, a multilayer mirror made of a multilayer coating of dielectric (to be also sometimes referred to as "multilayer reflective coating").

Two-dimensional optical scanning can be achieved by controlling the phase of light input to each of the waveguide elements 10 and by further simultaneously changing, in a synchronous manner, the refractive index or thickness of the optical waveguide layer 20 of each waveguide element 10, or the wavelength of light input to the optical waveguide layer 20.

To achieve such two-dimensional scanning, the inventors have conducted an analysis on the operating principle of the waveguide elements 10. Based on the results of the analysis, the inventors have succeeded in achieving two-dimensional optical scanning by synchronously driving the waveguide elements 10.

As illustrated in FIG. 1, as light is input to each waveguide element 10, light is emitted through the emission surface of the waveguide element 10. The emission surface is located on the opposite side of the first mirror 30 from the reflecting surface. The direction D3 of the emitted light depends on the refractive index of the optical waveguide layer, the thickness of the optical waveguide layer, and the wavelength of light. According to embodiments of the present disclosure, at least one of the refractive index of each optical waveguide layer, the thickness of each optical waveguide layer, or the wavelength is controlled synchronously such that light is emitted from each waveguide element 10 in substantially the same direction. This makes it possible to change the X direction component of the wave vector of light emitted from each of the waveguide elements 10. In other words, this makes it possible to change the direction D3 of the emitted light with respect to a direction 101 illustrated in FIG. 1.

Further, light rays emitted from the waveguide elements 10 point in the same direction. The emitted light rays thus interfere with each other. By controlling the phases of light rays emitted from individual waveguide elements 10, the direction in which the light rays constructively interfere with each other can be changed. For instance, if plural waveguide elements 10 of the same size are arranged at equal intervals in the Y direction, light rays each differing in phase by a constant amount are input to the corresponding waveguide elements 10. By changing the phase difference, the Y direction component of the wave vector of emitted light can be changed. In other words, by changing the phase difference between rays of light introduced into the waveguide elements 10, the direction D3 in which emitted light rays constructively interfere with each other can be changed with respect to a direction 102 illustrated in FIG. 1. Two-dimensional optical scanning can be achieved in this way.

Reference is now made to the operating principle of the optical scanning device 98.

<Operating Principle of Waveguide Elements>

Figure 2:
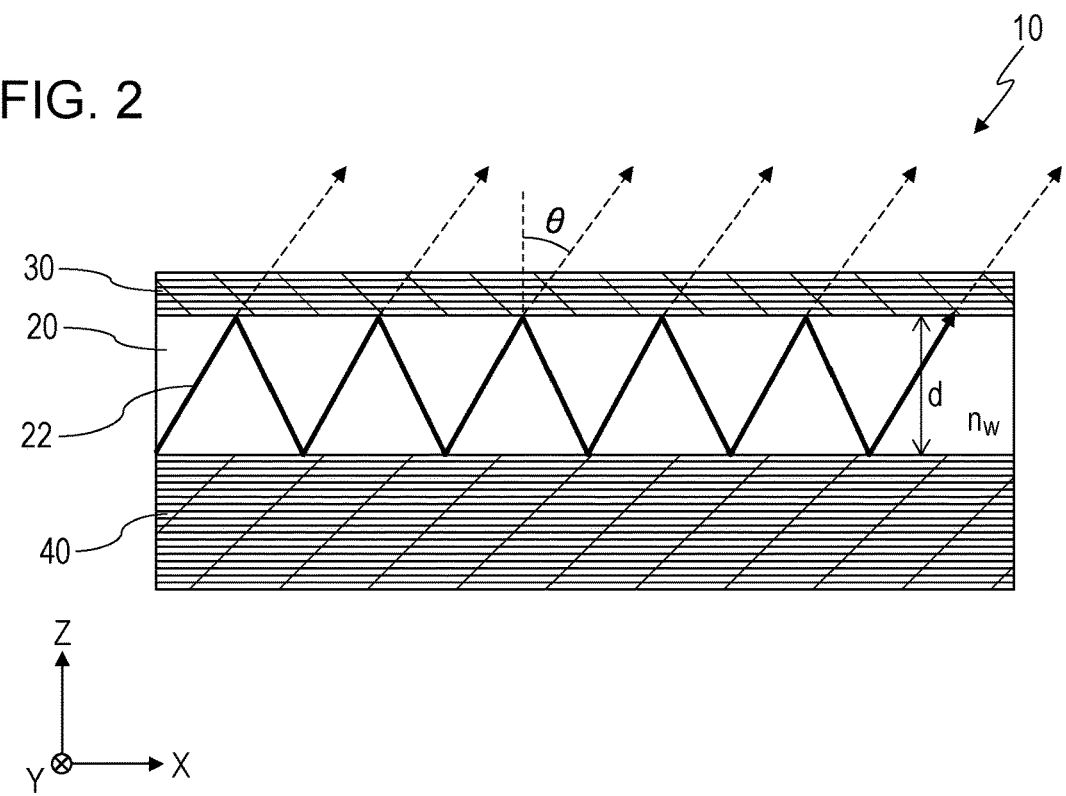
FIG. 2 schematically illustrates an exemplary cross-sectional structure of one waveguide element, and exemplary propagation of light in the waveguide element.

FIG. 2 schematically illustrates an exemplary cross-sectional structure of one waveguide element 10, and exemplary propagation of light in the waveguide element 10. FIG. 2 schematically illustrates a cross-section of the waveguide element 10 parallel to an X-Z plane, with a direction perpendicular to the X direction and the Y direction in FIG.

1 being defined as a Z direction. The waveguide element 10 includes the pair of mirrors 30 and 40 disposed so as to sandwich the optical waveguide layer 20. Light 22 introduced into the optical waveguide layer 20 through one end of the optical waveguide layer 20 in the X direction propagates within the optical waveguide layer 20 while being repeatedly reflected by the first mirror 30 disposed on the top side (the upper surface in FIG. 2) of the optical waveguide layer 20 and by the second mirror 40 disposed on the bottom side (the lower surface in FIG. 2) of the optical waveguide layer 20. The first mirror 30 has a light transmittance higher than the light transmittance of the second mirror 40. This allows a portion of the light to be output mainly through the first mirror 30. Depending on the intended application, the transmittance of the first mirror and the transmittance of the second mirror may be adjusted to allow emission of light through the second mirror 40 instead of the first mirror 30 or to allow emission of light through the first mirror 30 and the second mirror 40.

In common waveguides such as optical fibers, light propagates along such a waveguide while undergoing repeated total internal reflections. This contrasts with the waveguide element 10 according to embodiments of the present disclosure, in which light propagates while being repeatedly reflected by the mirrors 30 and 40 disposed on the top and bottom of the optical waveguide layer 20. Thus, there is no constraint on the angle of light propagation. The term "angle of light propagation" as used herein means the angle of incidence on the interface between the mirror 30 or 40 and the optical waveguide layer 20. The waveguide element 10 also allows propagation of light that is incident on the mirror 30 or 40 at an angle closer to the perpendicular to the mirror 30 or 40. That is, the waveguide element 10 also allows propagation of light that is incident on the interface at an angle less than the critical angle for total internal reflection. Consequently, the group velocity of light in the direction of light propagation decreases significantly relative to the velocity of light in free space. For this reason, the waveguide element 10 has a property such that the condition of light propagation varies greatly with a change in the wavelength of light, a change in the thickness of the optical waveguide layer 20, and a change in the refractive index of the optical waveguide layer 20. Such a waveguide is referred to as "reflective waveguide" or "slow light waveguide".

The angle of emission θ of light emitted into the air from the waveguide element 10 is given by Equation (1) below.

$$\sin\theta = \sqrt{n_w^2 - \left(\frac{m\lambda}{2d}\right)^2} \quad (1)$$

As can be appreciated from Equation (1), the direction of light emission can be changed by changing any one of the wavelength λ of light in the air, the refractive index $n_w$ of the optical waveguide layer 20, or the thickness d of the optical waveguide layer 20.

For instance, if $n_w$=2, d=387 nm, λ=1550 nm, and m=1, the angle of emission is zero degrees. Changing the refractive index $n_w$ to 2.2 in this state causes the angle of emission to change to approximately 66 degrees. Changing the thickness d to 420 nm without changing the refractive index causes the angle of emission to change to approximately 51 degrees. Changing the wavelength λ to 1500 nm without changing neither the refractive index nor the thickness causes the angle of emission to change to approximately 30 degrees. In this way, the direction of light emission can be changed greatly by changing any one of the wavelength λ of light, the refractive index $n_w$ of the optical waveguide layer 20, or the thickness d of the optical waveguide layer 20.

Accordingly, the optical scanning device 98 according to embodiments of the present disclosure controls the direction of light emission by controlling at least one of the wavelength λ of light input to the optical waveguide layer 20, the refractive index $n_w$ of the optical waveguide layer 20, or the thickness d of the optical waveguide layer 20. The wavelength λ of light may be kept constant without being changed during operation. This allows optical scanning to be achieved by means of a simpler configuration. The wavelength λ is not limited to a particular wavelength. In one example, the wavelength λ may fall within a range of wavelengths from 400 nm to 1100 nm (from the visible to near-infrared wavelengths of light) where high detection sensitivity is obtained with common photodetectors or image sensors that detect light through absorption of light by silicon (Si). In another example, the wavelength λ may fall within a near-infrared wavelength range from 1260 nm to 1625 nm where optical fibers or Si waveguides have comparatively small transmission loss. The above-mentioned wavelength ranges are for illustrative purpose only. The wavelength range of light to be used may not necessarily be the visible or near-infrared wavelength range but may be the ultraviolet wavelength range.

To change the direction of emitted light, the optical scanning device 98 may include a first adjustment element that changes, for each waveguide element 10, at least one of the refractive index of the optical waveguide layer 20, the thickness of the optical waveguide layer 20, or wavelength.

As described above, by using the waveguide element 10, the direction of light emission can be changed greatly by changing at least one of the refractive index $n_w$ of the optical waveguide layer 20, the thickness d of the optical waveguide layer 20, or the wavelength λ. As a result, the angle of emission at which light is emitted through the mirror 30 can be changed with respect to the direction along the waveguide element 10. Such one-dimensional scanning can be achieved by use of at least one waveguide element 10.

To allow adjustment of the refractive index of at least a portion of the optical waveguide layer 20, the optical waveguide layer 20 may include a liquid crystal material or an electro-optic material. The optical waveguide layer 20 may be sandwiched between a pair of electrodes. By applying voltage to the pair of electrodes, the refractive index of the optical waveguide layer 20 can be changed.

To allow adjustment of the thickness of the optical waveguide layer 20, for example, at least one of the first mirror 30 or the second mirror 40 may be connected with at least one actuator. By changing the distance between the first mirror 30 and the second mirror 40 by use of the at least one actuator, the thickness of the optical waveguide layer 20 can be changed. If the optical waveguide layer 20 is made of liquid, the thickness of the optical waveguide layer 20 may be readily changed.

<Operating Principle of Two-Dimensional Scanning>

In a waveguide array with plural waveguide elements 10 arranged in one direction, the direction of light emission changes due to the interference of light rays emitted from individual waveguide elements 10. The direction of light emission can be changed by adjusting the phase of light to be supplied to each individual waveguide element 10. Reference is now made to the principle of this operation.

Figure 3A:
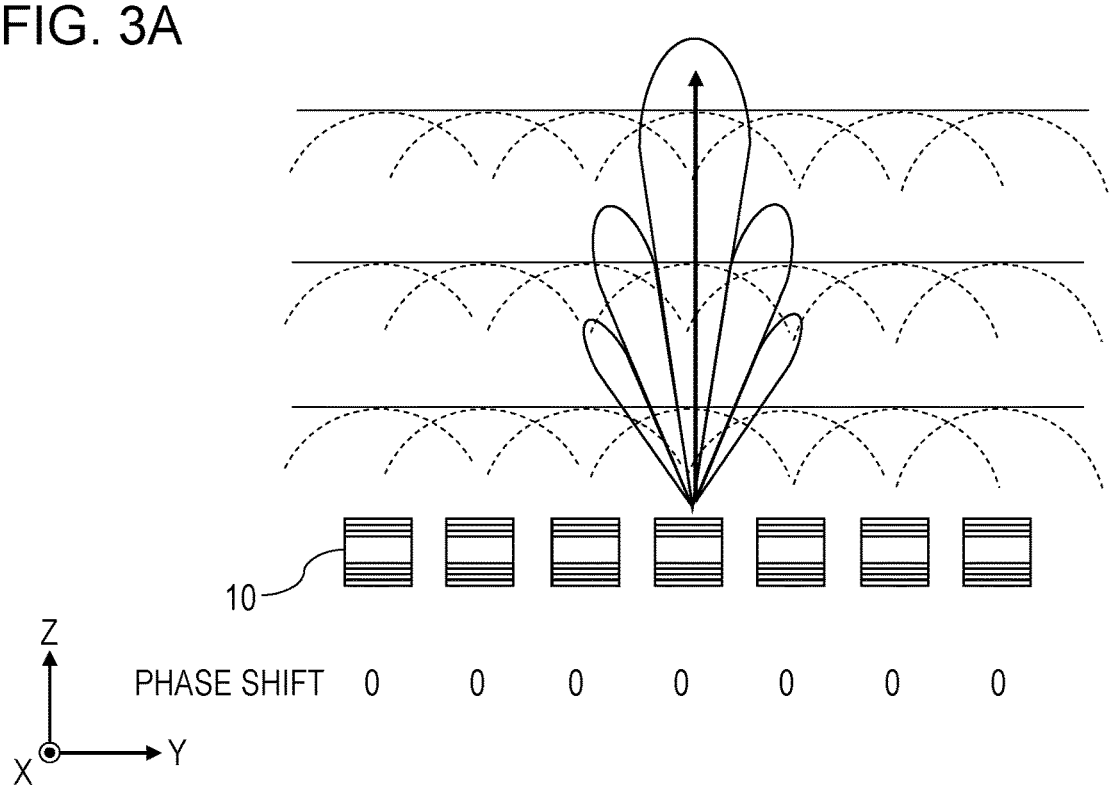
FIG. 3A illustrates a cross-section of a waveguide array that emits light in a direction perpendicular to the emission surface of the waveguide array.

FIG. 3A illustrates a cross-section of a waveguide array that emits light in a direction perpendicular to the emission surface of the waveguide array. FIG. 3A also includes an indication of the amount of phase shift for light propagating in each waveguide element 10. The amount of phase shift is a value referenced to the phase of light that propagates in the leftmost waveguide element 10. The waveguide array according to embodiments of the present disclosure includes plural waveguide elements 10 arranged at equal intervals. In FIG. 3A, the dashed circular arcs represent the wavefronts of light rays emitted from individual waveguide elements 10. The solid straight lines each represent a wavefront formed by an interference beam produced by interference of light rays. The solid closed curved lines each represent the intensity distribution of the interference beam. The interference beam includes a main lobe at the center, and side lobes on both sides of the main lobe. The main lobe corresponds to 0th order diffracted light. Although not illustrated in FIG. 3A, the interference beam may also include a grating lobe corresponding to higher order diffracted light. The arrow represents the direction of 0th order diffracted light emitted from the waveguide array. In the example illustrated in FIG. 3A, light rays propagating in the optical waveguide layers 20 of individual waveguide elements 10 are all equal in phase. In this case, light is emitted in a direction (Z direction) perpendicular to both a direction in which the waveguide elements 10 are arranged (Y direction) and a direction (X direction) in which the optical waveguide layer 20 extends.

Figure 3B:
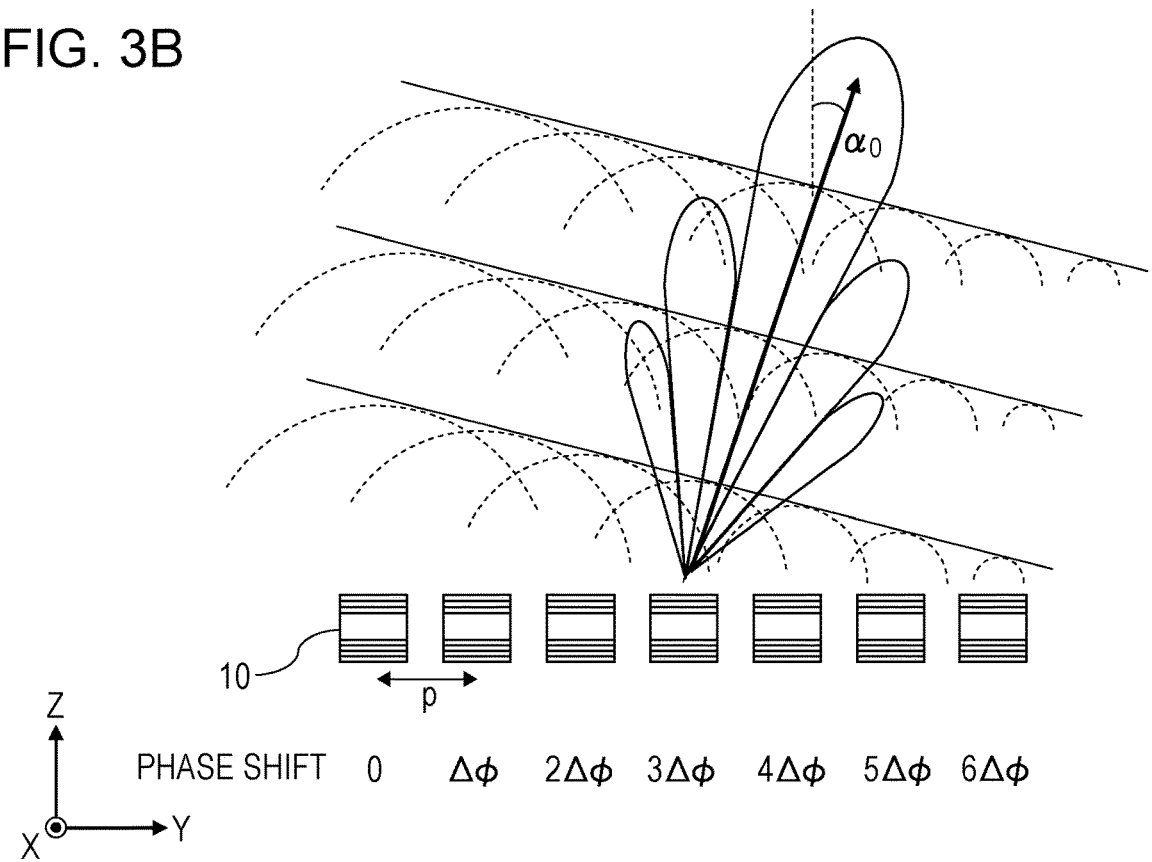
FIG. 3B illustrates a cross-section of a waveguide array that emits light in a direction different from a direction perpendicular to the emission surface of the waveguide array.

FIG. 3B illustrates a cross-section of a waveguide array that emits light in a direction different from a direction perpendicular to the emission surface of the waveguide array. In the example illustrated in FIG. 3B, light rays propagating in the respective optical waveguide layers 20 of the waveguide elements 10 have a constant relative phase difference ($\Delta\phi$) in the direction of arrangement of the waveguide elements 10. In this case, light is emitted in a direction different from the Z direction. By changing the value of $\Delta\phi$ the Y direction component of light can be changed. Assuming that the center-to-center distance between two adjacent waveguide elements 10 is p, the angle of light emission $\alpha_0$ is given by Equation (2) below.

$$\sin\alpha_0 = \frac{\Delta\phi\lambda}{2\pi p} \quad (2)$$

In the example illustrated in FIG. 2, the direction of light emission is parallel to the X-Z plane. That is, $\alpha_0=0$ degrees. In each of the examples illustrated in FIGS. 3A and 3B, the direction of light emitted from the optical scanning device 98 is parallel to the Y-Z plane. That is, $\theta=0$ degrees. In general, however, the direction of light emitted from the optical scanning device 98 is parallel to neither the X-Z plane nor the Y-Z plane. That is, $\theta\neq 0$ degrees and $\alpha_0\neq 0$ degrees.

Figure 4:
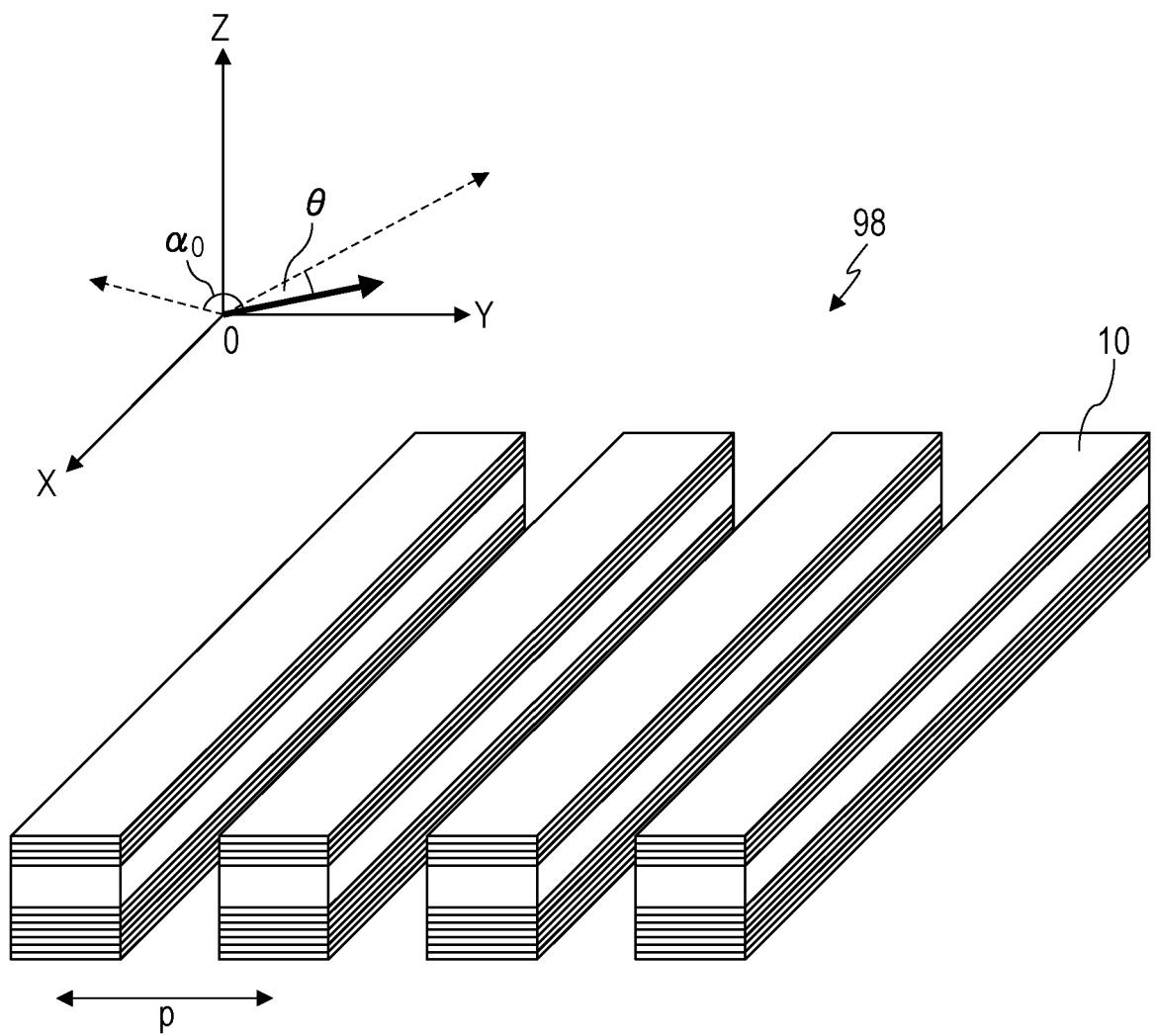
FIG. 4 is a schematic perspective view of a waveguide array in a three-dimensional space.

FIG. 4 is a schematic perspective view of a waveguide array in a three-dimensional space. The bold arrow in FIG. 4 represents the direction of light emitted from the optical scanning device 98. $\theta$ is an angle formed by the direction of emission of light and the Y-Z plane. The angle $\theta$ satisfies Equation (1). $\alpha_0$ is an angle formed by the direction of emission of light and the X-Z plane. The angle $\alpha_0$ satisfies Equation (2).

<Control of Phase of Light Introduced into Waveguide Array>

To control the phase of light emitted from each of the waveguide elements 10, for example, a phase shifter for varying the phase of light may be disposed upstream of the location where light is introduced into the waveguide element 10. The optical scanning device 98 according to embodiments of the present disclosure includes plural phase shifters each connected to the corresponding one of the waveguide elements 10, and a second adjustment element that adjusts the phase of light that propagates in each phase shifter. Each phase shifter includes a waveguide that is connected either directly or via another waveguide with the optical waveguide layer 20 of the corresponding one of the waveguide elements 10. The second adjustment element changes the relative phase difference between individual light rays propagating from the phase shifters to the corresponding waveguide elements 10 to thereby change the direction of light emitted from each of the waveguide elements 10 (i.e., the third direction D3). As with the waveguide array, an arrangement of plural phase shifters will be hereinafter sometimes referred to as "phase shifter array".

Figure 5:
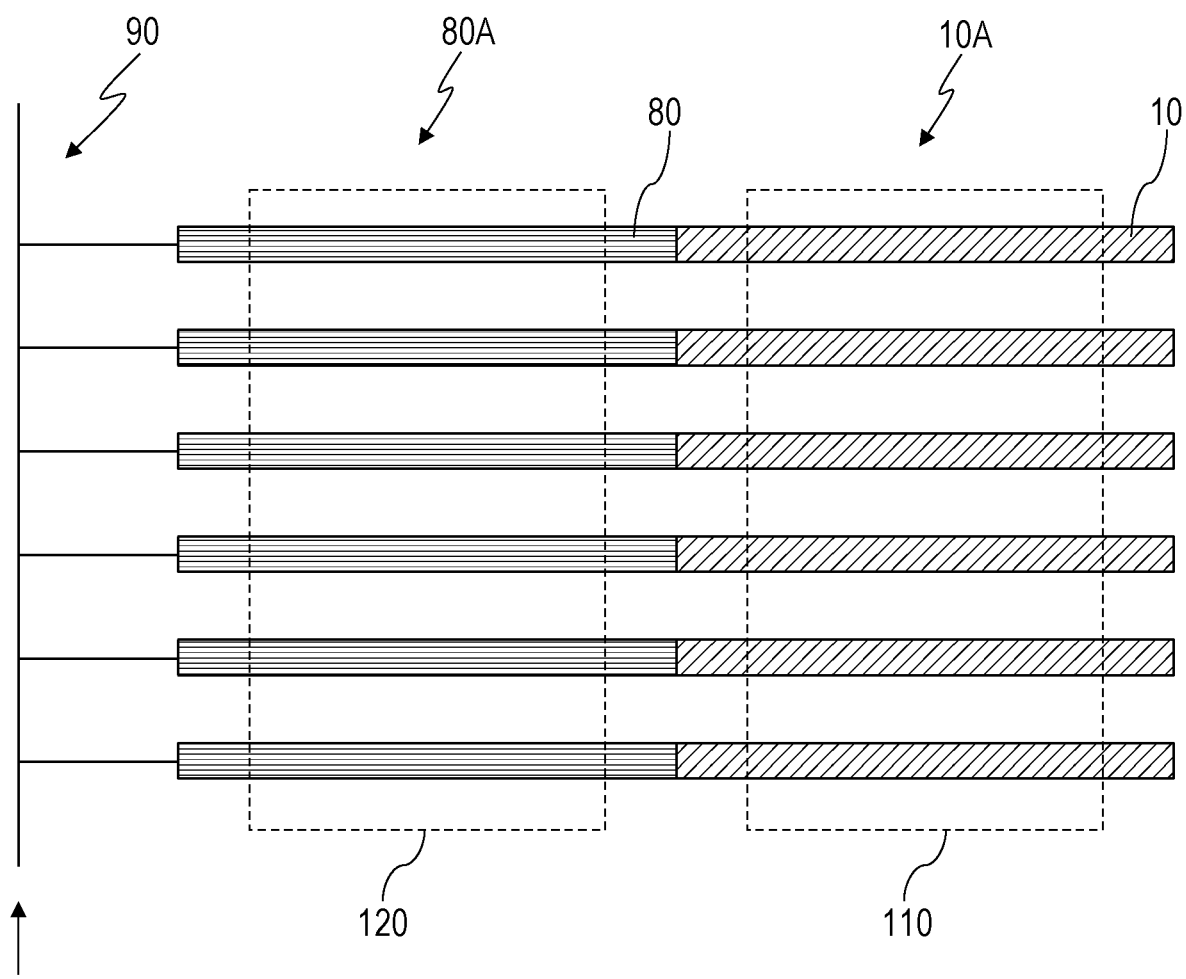
FIG. 5 schematically illustrates a waveguide array and a phase shifter array, as viewed in a direction (Z direction) normal to a light emission surface.

FIG. 5 schematically illustrates a waveguide array 10A and a phase shifter array 80A, as viewed in a direction (Z direction) normal to a light emission surface. In the example in FIG. 5, phase shifters 80 all have the same propagation characteristics, and the waveguide elements 10 all have the same propagation characteristics. The phase shifters 80 may have the same length or different lengths, and the waveguide elements 10 may have the same length or different lengths. If the phase shifters 80 are equal in length, the amount of phase shift provided by each phase shifter 80 can be adjusted by means of, for example, a drive voltage. Alternatively, by varying the respective lengths of the phase shifters 80 in equal steps, phase shifts varied in equal steps can be provided by means of the same drive voltage. The optical scanning device 98 further includes an optical divider 90 that divides light into light rays that are supplied to the phase shifters 80, a first drive circuit 110 that drives each waveguide element 10, and a second drive circuit 120 that drives each phase shifter 80. The straight arrow in FIG. 5 represents input of light. Two-dimensional scanning can be achieved by independently controlling the first drive circuit 110 and the second drive circuit 120, which are provided as separate circuits. In this example, the first drive circuit 110 functions as one component of the first adjustment element, and the second drive circuit 120 functions as one component of the second adjustment element.

The first drive circuit 110 changes at least one of the refractive index or thickness of the optical waveguide layer 20 in each waveguide element 10 to thereby change the angle of light emitted from the optical waveguide layer 20. The second drive circuit 120 changes the refractive index of the waveguide in each phase shifter 80 to thereby change the phase of light that propagates inside the waveguide. The optical divider 90 may be implemented by a waveguide in which light propagates through total internal reflection, or may be implemented by a reflective waveguide that is similar to the waveguide elements 10.

Each of the rays into which light is divided by the optical divider 90 may be subjected to phase control before being introduced into the corresponding phase shifter 80. The phase control may be performed by use of, for example, a passive phase control structure based on adjustment of the length of the waveguide leading to each phase shifter 80. Alternatively, the phase control may be performed by use of phase shifters that are similar in function to the phase shifters 80 and that can be controlled by electrical signals. By using the above-mentioned methods, for example, light rays may be adjusted in phase before being introduced into individual phase shifters 80 so that light rays with equal phase are supplied to all of the phase shifters 80. Such adjustment allows the second drive circuit 120 to control each phase shifter 80 in a simple manner.

An optical device that is similar in configuration to the optical scanning device 98 described above can be also used as an optical receiver device. Details of such an optical device including its operating principle and operating method are disclosed in U.S. Patent Application Publication No. 2018/0224709, the entire disclosure of which is incorporated herein by reference.

The optical device 98 mentioned above includes plural waveguide elements 10. As a result of further contemplating a simpler optical device configuration for achieving two-dimensional scanning, the inventors have found that plural waveguide elements 10 are not necessarily required to achieve two-dimensional scanning. As will be described below, an optical device according to the present disclosure includes plural optical waveguides, and a planar waveguide connected directly or indirectly with the optical waveguides. The planar waveguide includes the optical waveguide layer 20, the mirror 30, and the mirror 40. Two-dimensional scanning can be achieved also by means of such a simple configuration.

An optical scanning device and an optical receiver device according to embodiments of the present disclosure may be used as, for example, an antenna in photodetection systems such as light detection and ranging (LiDAR) systems. In comparison to radar systems, which use radio waves such as millimeter waves, LiDAR systems use electromagnetic radiations with shorter wavelengths (such as visible, infrared, or ultraviolet radiations) and therefore allow for detection of object distance distribution with higher resolution. Such a LiDAR system may be installed in a mobile object, such as an automobile, an unmanned aerial vehicle (UAV) (so-called drone), or an automated guided vehicle (AGV), and employed as one of collision avoidance techniques. The optical scanning device and the optical receiver device will be herein sometimes collectively referred to as "optical device". A device used in such an optical scanning device or optical receiver device will be also sometimes referred to as "optical device".

An optical device according to a first item includes a plurality of optical waveguides that each extend in a first direction, and are arranged in a second direction intersecting the first direction, and a planar optical waveguide that is directly or indirectly connected with the plurality of optical waveguides. The plurality of optical waveguides each allow light to propagate in the first direction. The planar optical waveguide includes a first mirror and a second mirror that face each other and extend in the first direction and the second direction, and an optical waveguide layer located between the first mirror and the second mirror.

With the optical device described above, light rays that propagate through the optical waveguides are made to interfere with each other within the optical waveguide layer of the planar optical waveguide. As a result, optical scanning can be achieved by means of a relatively simple configuration.

In the optical device according to a second item, the optical device according to the first item further includes at least one of an electrode or an actuator. The electrode causes the optical waveguide layer to change in refractive index. The actuator causes the optical waveguide layer to change in thickness.

With the optical device described above, the direction of light emitted externally from the optical waveguide layer through the first mirror and/or the second mirror can be changed by changing at least one of the refractive index or thickness of the optical waveguide layer.

In the optical device according to a third item, the optical device according to the first or second item further includes an other optical waveguide disposed between the plurality of optical waveguides and the planar optical waveguide. The plurality of optical waveguides branch off from the other optical waveguide.

With the optical device described above, light rays that have propagated through the optical waveguides and interfered with each other within the other optical waveguide are allowed to propagate into the planar optical waveguide.

In the optical device according to a fourth item, in the optical device according to the first or second item, the optical waveguide layer of the planar optical waveguide includes an optical coupling portion and an optical waveguide portion. The optical coupling portion contains a distal end portion of each of the plurality of optical waveguides. The optical waveguide portion is adjacent to the optical coupling portion. The distal end portion of each of the plurality of optical waveguides includes one or more gratings.

With the optical device described above, light rays that propagate through the optical waveguides are allowed to efficiently propagate into the optical waveguide layer of the planar optical waveguide.

In the optical device according to a fifth item, in the optical device according to the third item, the optical waveguide layer of the planar optical waveguide includes an optical coupling portion and an optical waveguide portion. The optical coupling portion contains a distal end portion of the other optical waveguide. The optical waveguide portion is adjacent to the optical coupling portion. The distal end portion of the other optical waveguide includes one or more gratings.

With the optical device described above, light rays that have propagated through the optical waveguides and interfered with each other within the other optical waveguide are allowed to efficiently propagate into the optical waveguide layer of the planar optical waveguide.

In the optical device according to a sixth item, in the optical device according to the fourth or fifth item, a refractive index and/or thickness of the optical coupling portion of the optical waveguide layer, and a refractive index and/or thickness of the optical waveguide portion of the optical waveguide layer can be adjusted individually.

The optical device described above makes it possible to change the direction of light emitted through the first mirror and/or the second mirror while maintaining efficient coupling of light from the optical waveguides to the optical waveguide layer.

In the optical device according to a seventh item, in the optical device according to any one of the first to sixth items, the plurality of optical waveguides are arranged at equal intervals in the second direction.

With the optical device described above, if each of light rays propagating in the optical waveguides is changed in phase in the second direction by a constant amount, the direction of light emitted through the first mirror and/or the second mirror can be changed.

In the optical device according to an eighth item, in the optical device according to any one of the first to sixth items, the plurality of optical waveguides include a first optical waveguide, a second optical waveguide, and a third optical waveguide that are arranged sequentially in the second direction in an order of the first optical waveguide, the second optical waveguide, and the third optical waveguide.

The center-to-center distance between the first optical waveguide and the second optical waveguide is different from the center-to-center distance between the second optical waveguide and the third optical waveguide.

The optical device described above makes it possible to suppress side lobes and grating lobes that are generated by interference of light rays within the optical waveguide layer.

In the optical device according to a ninth item, the optical device according to any one of the first to eighth items further includes a phase shifter that changes a phase difference between rays of the light that each propagate in each of the plurality of optical waveguides.

With the optical device described above, the direction of light emitted through the first mirror and/or the second mirror can be changed by means of the phase shifter.

A photodetection system according to a tenth item includes the optical device according to any one of the first to ninth items, a photodetector that detects light emitted from the optical device and reflected by a target object, and a signal processing circuit that, based on an output of the photodetector, generates distance distribution data.

The photodetection system described above is capable of generating a ranging image of the target object.

According to the present disclosure, each circuit, unit, apparatus, device, component, or part, or each functional unit in block diagrams may, in whole or in part, be implemented as one or more electronic circuits including, for example, a semiconductor device, a semiconductor integrated circuit (IC), or a large scale integration (LSI). An LSI or an IC may be integrated in a single chip or may be a combination of plural chips. For example, functional blocks other than a storage element may be integrated in a single chip. Although herein called LSI or IC, each such electronic circuit is called differently depending on the degree of integration, and may be an electronic circuit called a system LSI, a very large scale integration (VLSI), or ultra large scale integration (VLSI). A field programmable gate array (FPGA), which is programmed after manufacture of an LSI, or a reconfigurable logic device, which allows reconfiguration of connections inside an LSI or allows set-up of circuit segments inside an LSI, may be used for the same purpose.

Further, the functions or operations of circuits, units, apparatuses, devices, components, or parts may, in whole or in part, be implemented by software processing. In this case, the software is stored in one or more non-transitory storage media such as ROMs, optical discs, or hard disk drives, and when the software is executed by a processor, functions specified in the software are executed by the processor and peripheral devices. A system, or device or apparatus may include one or more non-transitory storage media in which the software is stored, a processor, and a required hardware device, such as an interface.

As used herein, the term "light" means electromagnetic waves including not only visible light (with wavelengths ranging from approximately 400 nm to approximately 700 nm) but also ultraviolet rays (with wavelengths ranging from approximately 10 nm to approximately 400 nm) and infrared rays (with wavelengths ranging from approximately 700 nm to approximately 1 mm).

More specific embodiments of the present disclosure are described below. However, description that is too detailed will be omitted in some cases. For example, there are instances where detailed description of well-known matter and redundant description of substantially identical configurations are omitted. This is to prevent the following description from being unnecessarily redundant, and facilitate understanding of those skilled in the art. The accompanying drawings and the following description are provided by the inventors to allow those skilled in the art to fully understand the present disclosure, and thus not intended to limit the scope of the subject matter defined in the claims. In the following description, identical or similar components are denoted by the same reference signs.

Embodiment 1

Before describing Embodiment 1 of the present disclosure, a comparative example will be described below with reference to FIGS. 6A to 8C.

Figure 6A:
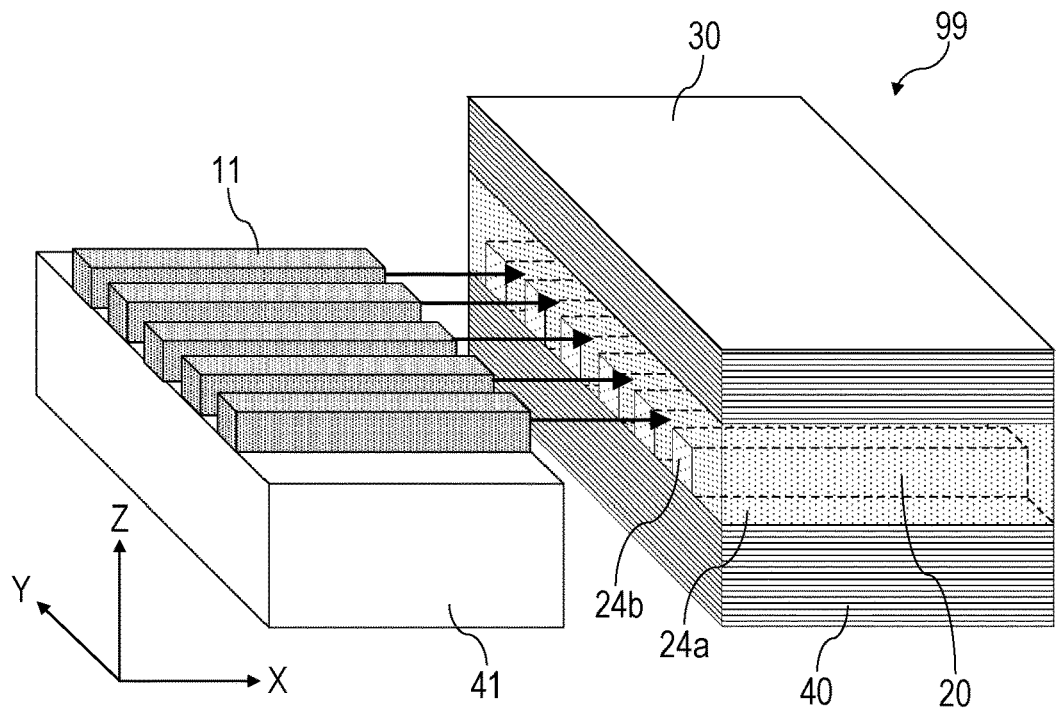
FIG. 6A is a schematic perspective view of an optical device according to a comparative example.

FIG. 6A is a schematic perspective view of an optical device 99 according to a comparative example. Although the structures at the left and right sides of FIG. 6A are illustrated to be separated from each other, these structures are typically in contact with each other. As will be described later, the optical device 99 according to the comparative example corresponds to the structure illustrated in FIG. 1 that includes an arrangement of plural waveguide elements 10.

In the example illustrated in FIG. 6A, the optical device 99 according to the comparative example includes plural optical waveguides 11 arranged in the Y direction, the mirror 30, the mirror 40, and the optical waveguide layer 20 located between the two mirrors. The optical waveguide layer 20 includes a first component 24a, and plural second components 24b that each extend in the X direction and that are arranged in the Y direction. Two lateral sides and top side of each second component 24b are in contact with the first component 24a. The bottom side of each second component 24b is in contact with the mirror 40. The optical waveguides 11 are disposed on a substrate 41. Each optical waveguide 11 has a refractive index higher than the refractive index in its surrounding area. The surrounding area includes a medium in contact with two lateral sides and top side of each optical waveguide 11, and the substrate 41 in contact with the bottom side of the optical waveguide 11. Each optical waveguide 11 allows light to propagate in the X direction through total internal reflection. The optical waveguides 11 may be branched from another optical waveguide.

Figure 6B:
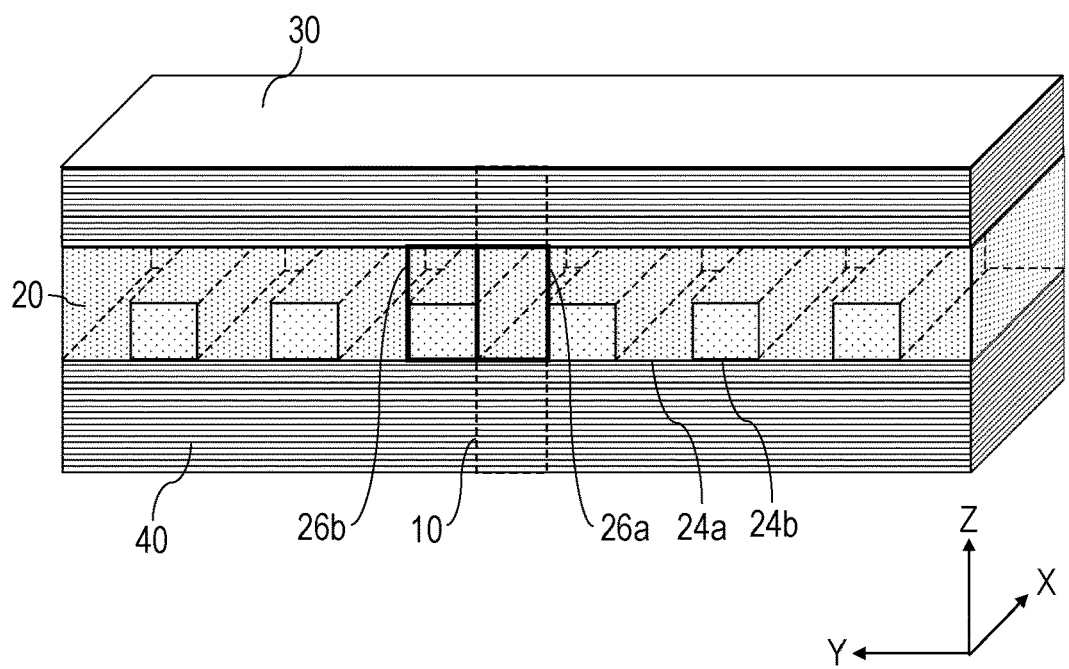
FIG. 6B is a schematic perspective view of a structure at the right side of FIG. 6A.

FIG. 6B is a schematic perspective view of the structure at the right side of FIG. 6A. However, the orientation of the structure is different. As illustrated in FIG. 6B, plural guiding portions 26a and plural non-guiding portions 26b, which are arranged alternately in the Y direction, exist between the mirror 30 and the mirror 40. The guiding portions 26a and the non-guiding portions 26b extend in the X direction. Each guiding portion 26a is located between two non-guiding portions 26b. Each guiding portion 26a includes the first component 24a. Each non-guiding portion 26b includes the first component 24a and the second component 24b. The first component 24a exists in both the guiding portions 26a and the non-guiding portions 26b. In the optical device 99 according to the comparative example, the first component 24a has a refractive index n1 higher than a refractive index n2 of the second components 24b. In this case, the guiding portions 26a have a refractive index higher than the mean refractive index of the non-guiding portions 26b. This allows light to propagate within the guiding portions 26a in the X direction due to total internal reflection in the Y direction. The first component 24a may be made of, for example, a liquid crystal material or an electro-optic material, and the second components 24b may be made of, for example, a dielectric material such as glass. The refractive index of the liquid crystal material may change with externally applied voltage.

In the example illustrated in FIG. 6B, each guiding portion 26a, a portion of the mirror 30 located directly above the guiding portion 26a, and a portion of the mirror 40 located directly below the guiding portion 26a constitute a structure corresponding to each waveguide element 10 mentioned above. That is, plural waveguide elements 10 are arranged in the Y direction.

In the optical device 99 according to the comparative example, an end face of each optical waveguide 11 parallel to the Y-Z plane, and an end face of the corresponding guiding portion 26a of the optical waveguide layer 20 parallel to the Y-Z plane are connected with each other.

Figure 7:
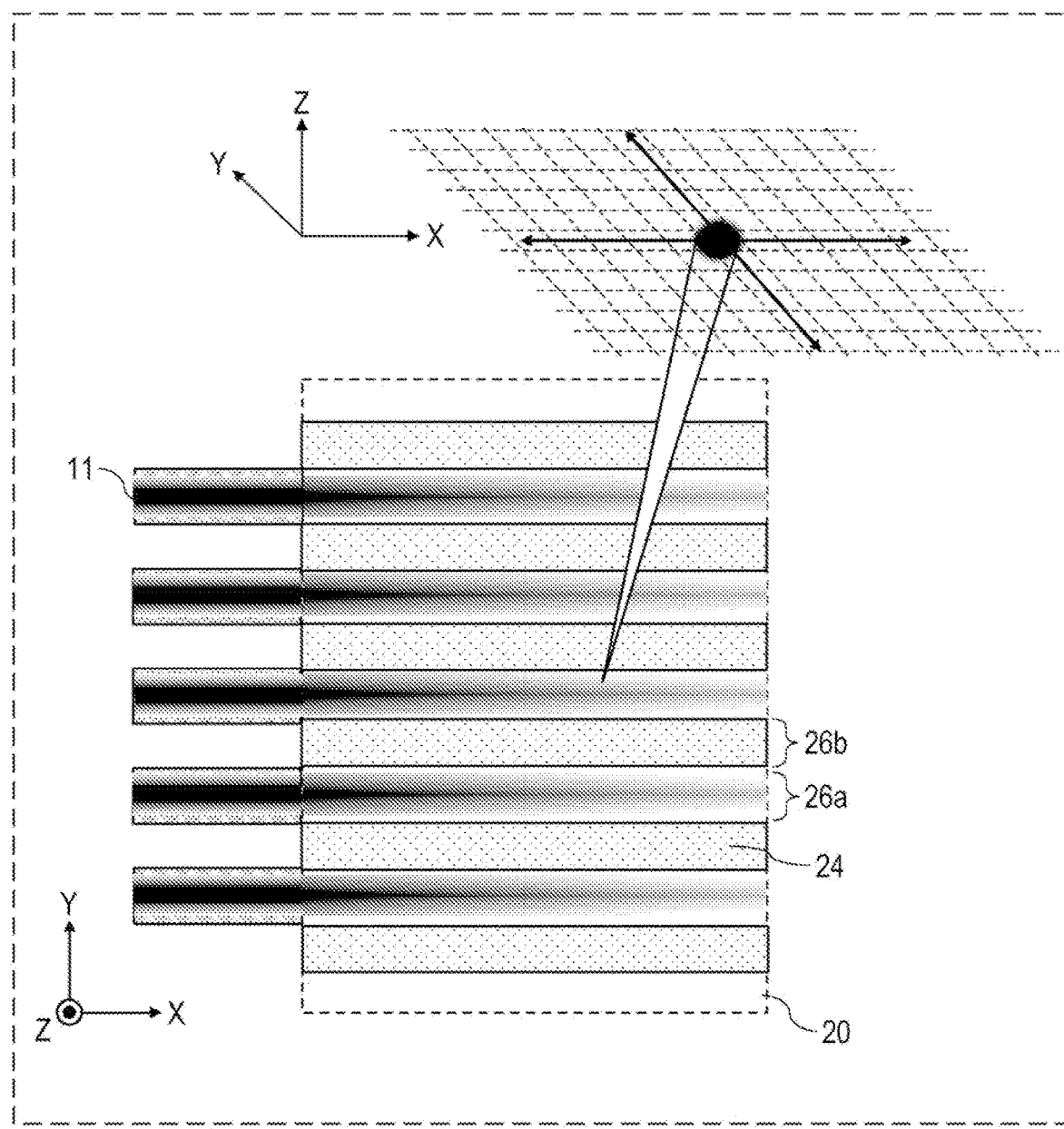
FIG. 7 schematically illustrates light beams being emitted from the optical device illustrated in FIG. 6A.

FIG. 7 schematically illustrates light being emitted from the optical device 99 illustrated in FIG. 6A. It is to be noted, however, that the mirror 30 and the mirror 40 are not depicted for simplicity. The optical waveguides 11 and the optical waveguide layer 20 are illustrated in plan view, whereas externally emitted light is illustrated in perspective view. The lighter and darker shades represent the intensity of light. Darker shades represent higher intensities, and lighter shades represent lower intensities.

In the example illustrated in FIG. 7, as light rays from the optical waveguides 11 propagate in the corresponding guiding portions 26a of the optical waveguide layer 20 in the X direction, the light rays are emitted externally through the mirror 30. Due to the external emission of light, the shading representing the intensity of light in each guiding portion 26a becomes progressively lighter in the +X direction. The light rays externally emitted from the guiding portions 26a through the mirror 30 interfere with each other as illustrated in FIGS. 3A and 3B, and form a light beam that propagates in a specific direction. As illustrated in FIG. 7, the light beam may be changed in the directions represented by the double-headed arrows.

Figure 8A:
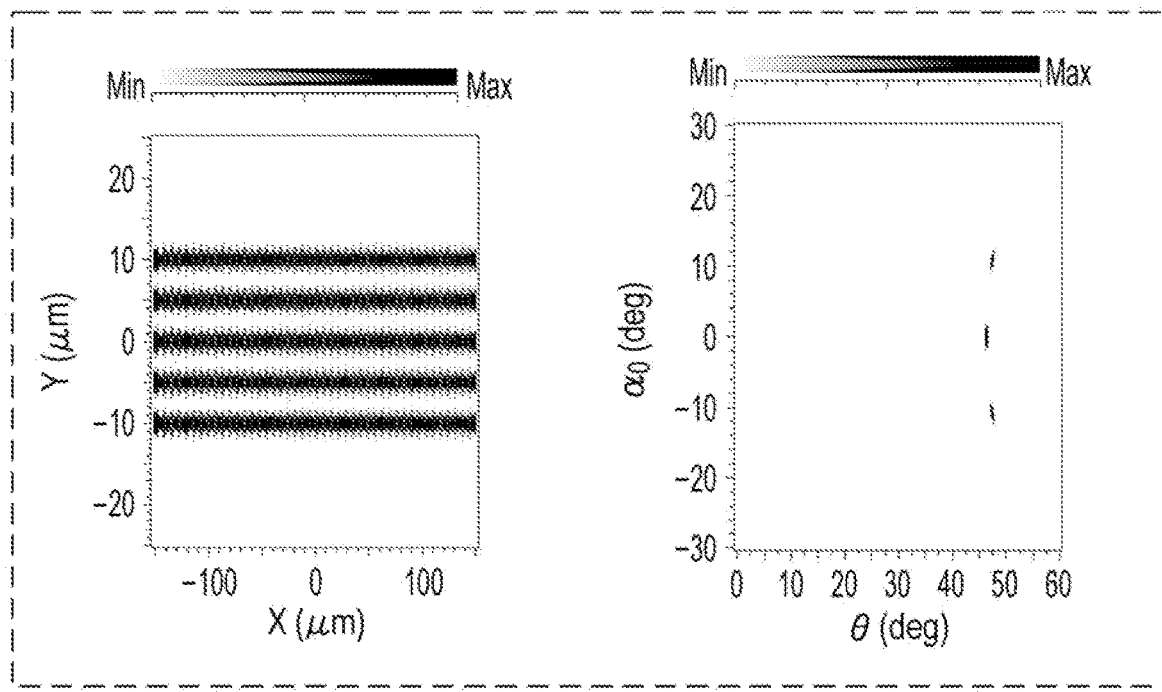
FIG. 8A illustrates, in accordance with a comparative example, an exemplary intensity distribution of light propagating between two mirrors, and an exemplary intensity distribution of light emitted to a distant location.
Figure 8B:
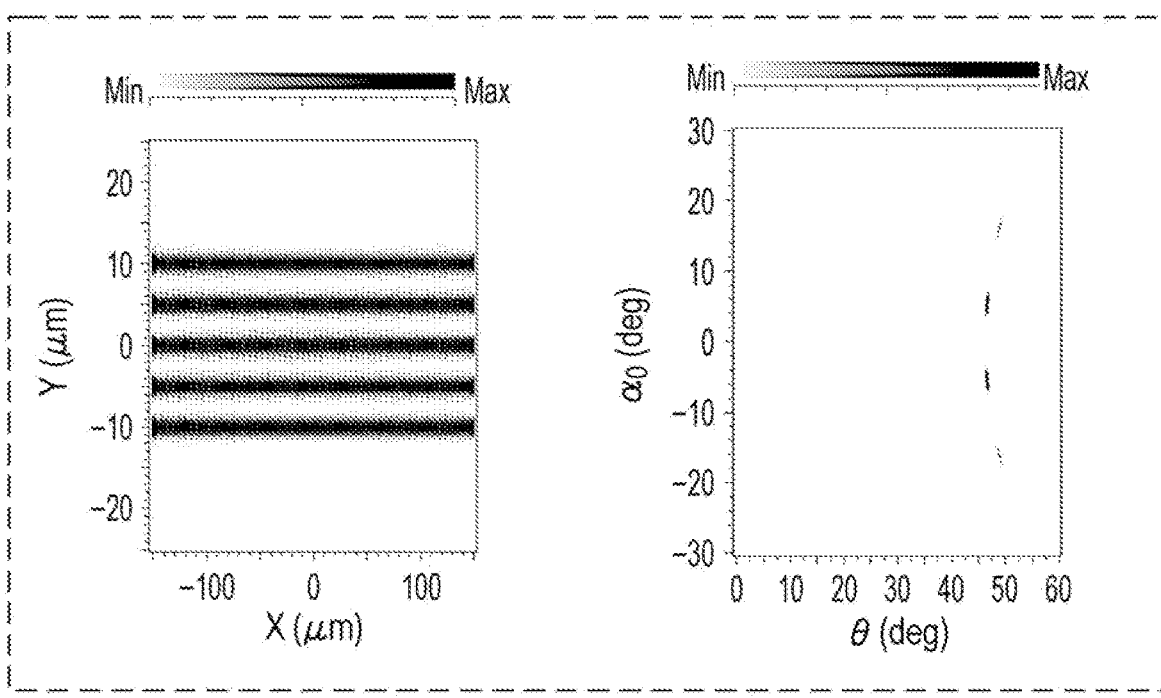
FIG. 8B illustrates, in accordance with a comparative example, an exemplary intensity distribution of light propagating between two mirrors, and an exemplary intensity distribution of light emitted to a distant location.
Figure 8C:
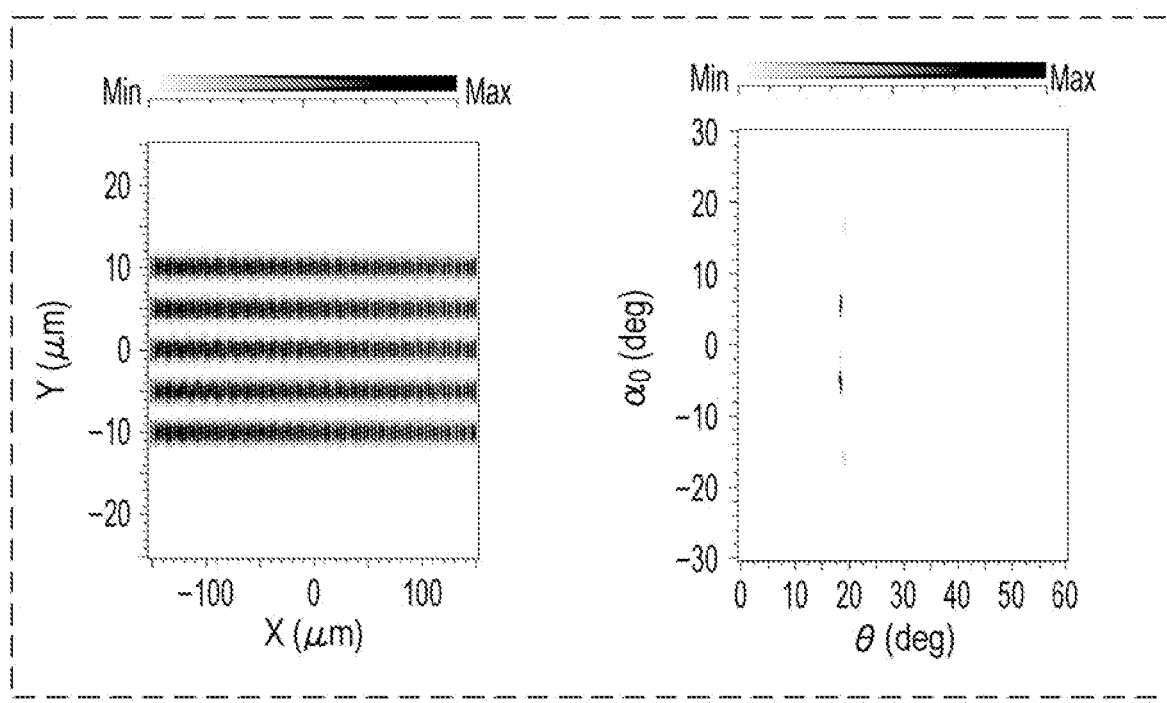
FIG. 8C illustrates, in accordance with a comparative example, an exemplary intensity distribution of light propagating between two mirrors, and an exemplary intensity distribution of light emitted to a distant location.

FIGS. 8A to 8C illustrate, in accordance with the comparative example, an exemplary intensity distribution of light that propagates between the mirror 30 and the mirror 40, and an exemplary intensity distribution of light emitted to a distant location. The left graph in each of FIGS. 8A to 8C represents the intensity distribution in the X-Y plane of light that propagates between the mirror 30 and the mirror 40. The left edge of the left graph corresponds to the location of connection between the optical waveguides 11 and the optical waveguide layer 20. The right graph in each of FIGS. 8A to 8C represents the intensity distribution of light emitted to a distant location. For calculation of the intensity distribution of light illustrated in the left and right graphs, ModePROP from Synopsys Inc. is used. A far-field pattern, which represents the intensity distribution of light emitted to a distant location, is calculated by a Fourier transform of the intensity distribution of light at the light emission surface of the mirror 30. In the example illustrated in FIGS. 8A to 8C, the spacing between the mirror 30 and the mirror 40 is 2.13 µm. The second components 24b each have a width of 2 µm, and a height of 0.9 µm. The guiding portions 26a each have a width of 3 µm, and the non-guiding portions 26b each have a width equal to the width of each second component 24b.

In the example illustrated in FIG. 8A, the first component 24a has a refractive index n1=1.68, and the second components 24b each have a refractive index n2=1.46. As illustrated in the left graph of FIG. 8A, light propagates in each guiding portion 26a in the X direction. Light rays propagating in the guiding portions 26a are all equal in phase. As illustrated in the right graph of FIG. 8A, the far-field pattern shows 0th order diffracted light at the center, and ±1st order diffracted light on both sides of the 0th order diffracted light. In the example illustrated in the right graph of FIG. 8A, light is emitted through the mirror 30 at an angle of emission θ of greater than or equal to 45 degrees and less than or equal to 50 degrees. The angle of emission θ is relatively large. The angle of emission $\alpha_0$ of the 0th order diffracted light is 0 degrees.

In the example illustrated in FIG. 8B, unlike in the example illustrated in FIG. 8A, light rays propagating in the optical waveguides 11 are each phase-shifted by $\Delta\phi=\pi$ in the +Y direction. The left graph of FIG. 8B is substantially the same as the left graph of FIG. 8A. In the right graph of FIG. 8B, in comparison to the right graph of FIG. 8A, the far-field pattern changes in a direction in which the angle of emission $\alpha_0$ increases. This means that due to the phase difference between input light rays, the Y direction component of light emitted through the mirror 30 has changed. In the example illustrated in the right graph of FIG. 8B, the angle of emission $\alpha_0$ of the 0th order diffracted light is 6 degrees. A similar change is also observed for the ±1st order diffracted light. Further, new higher-order diffracted light appears.

In the example illustrated in FIG. 8C, unlike in the example illustrated in FIG. 8B, the first component 24a has a refractive index n1=1.52. In the left graph of FIG. 8C, unlike in the left graph of each of FIGS. 8A and 8B, the intensity of light decreases in the +X direction. In the right graph of FIG. 8C, in comparison to the right graph of FIG. 8B, the far-field pattern changes in a direction in which the angle of emission $\alpha_0$ decreases. This means that due to the change in the refractive index of the optical waveguide layer 20, the λ direction component of light emitted through the mirror 30 has changed. In the example illustrated in the right graph of FIG. 8C, light is emitted through the mirror 30 at an angle of emission θ of greater than or equal to 15 degrees and less than or equal to 20 degrees. The angle of emission θ is relatively small.

Reference is now made to FIGS. 9A to 11C to describe an optical device according to embodiments of the present disclosure. An optical device according to embodiments of the present disclosure allows two-dimensional scanning to be achieved by means of a simple configuration in comparison to the optical device 99 according to the comparative example. In the following, description of features similar to those of the comparative example will be omitted in some cases.

Figure 9A:
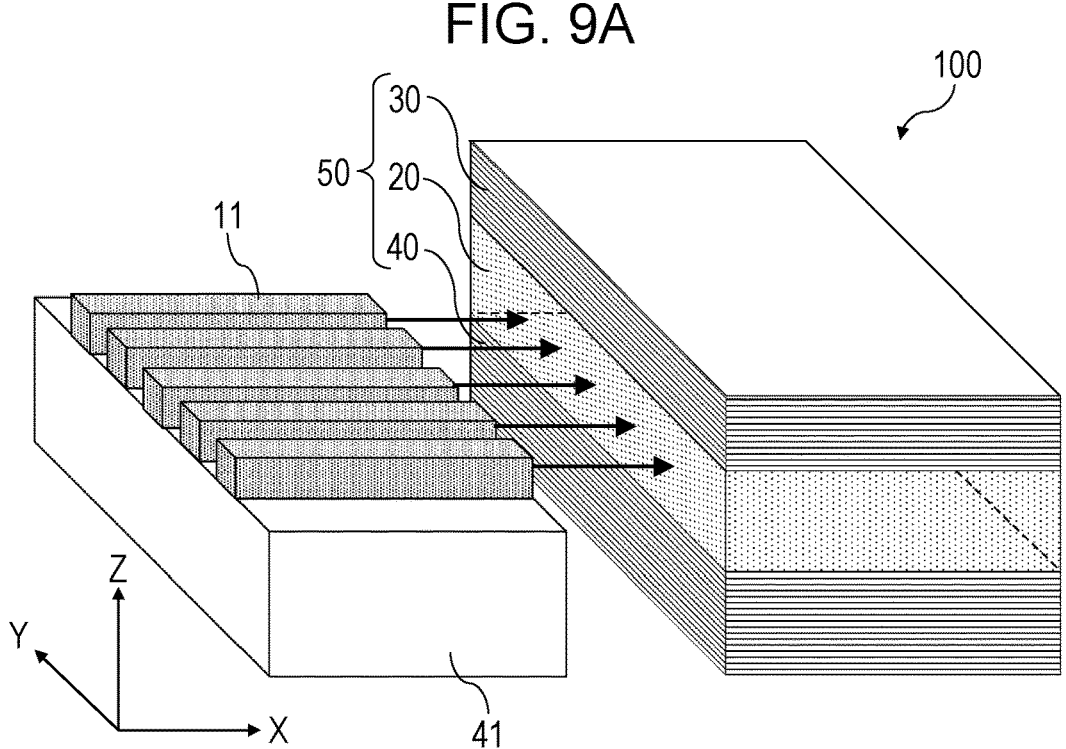
FIG. 9A schematically illustrates an optical device according to Embodiment 1.

FIG. 9A schematically illustrates an optical device 100 according to Embodiment 1 of the present disclosure. In the example illustrated in FIG. 9A, the optical device 100 includes plural optical waveguides 11, and a single planar optical waveguide 50 with which the optical waveguides 11 are directly connected. The planar optical waveguide 50 includes the mirror 30 and the mirror 40 that extend in the X direction and the Y direction, and the optical waveguide layer 20 located between the two mirrors. The optical device 100 according to Embodiment 1 of the present disclosure differs from the optical device 99 according to the comparative example in that plural second components 24b arranged in the Y direction do not exist within the optical waveguide layer 20.

Figure 9B:
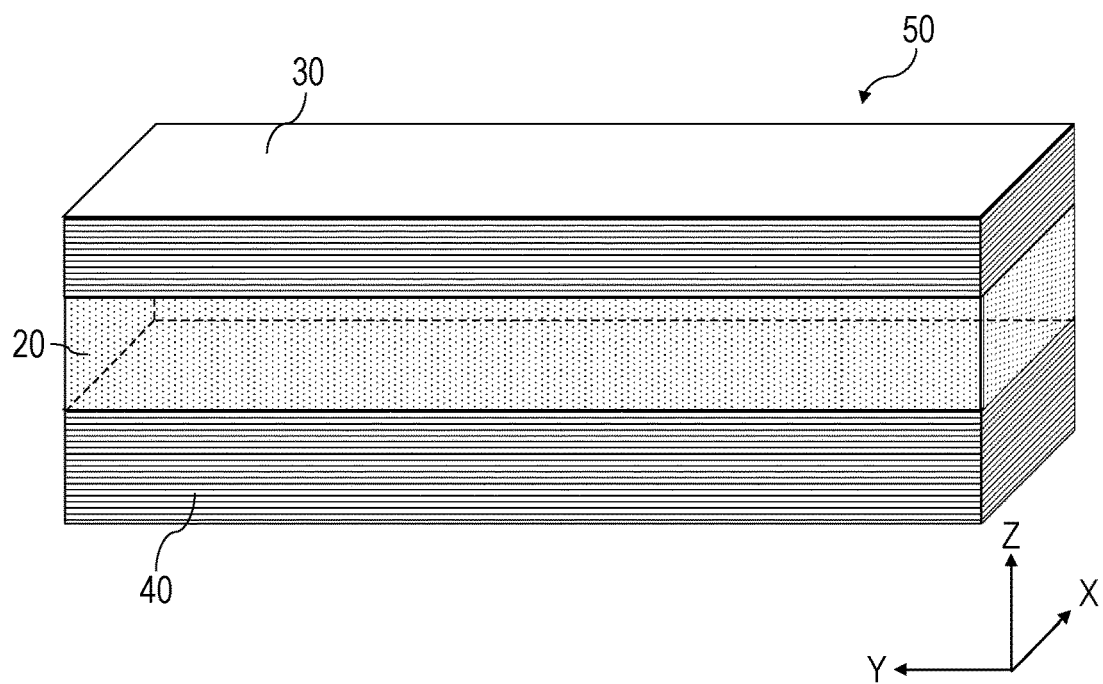
FIG. 9B is a schematic perspective view of a planar optical waveguide illustrated in FIG. 9A.

FIG. 9B is a schematic perspective view of the planar optical waveguide 50 illustrated in FIG. 9A. However, the orientation of the planar optical waveguide 50 is different. As illustrated in FIG. 9B, the optical waveguide layer 20 is uniform in any given direction parallel to the X-Y plane. In one example, the optical waveguide layer 20 may include, for example, a liquid crystal material or an electro-optic material. The refractive index of the liquid crystal material or the electro-optic material may change with externally applied voltage. In another example, the optical waveguide layer 20 may include, for example, a deformable liquid or gas. The thickness of the optical waveguide layer 20 may change as the spacing between the mirror 30 and the mirror 40 is changed. Changing the refractive index and/or thickness of the optical waveguide layer 20 makes it possible to change a component, parallel to the X direction, of light propagating in the optical waveguide layer 20 and emitted through the mirror 30. The first drive circuit 110 described above is capable of driving the planar optical waveguide 50 to change the refractive index and/or thickness of the optical waveguide layer 20. A specific configuration for driving the planar optical waveguide 50 will be described later.

The optical waveguides 11 may be connected with the phase shifter array 80A. Due to the phase shifter array 80A, each of light rays that propagate in the optical waveguides 11 can be shifted in phase by a constant amount in the Y direction. This makes it possible to change a component, parallel to the Y direction, of light propagating in the optical waveguide layer 20 and emitted through the mirror 30. The optical waveguides 11 may themselves function as the phase shifter array 80A. The second drive circuit 120 described above is capable of driving the phase shifter array 80A to perform the phase shifting described above.

Figure 10:
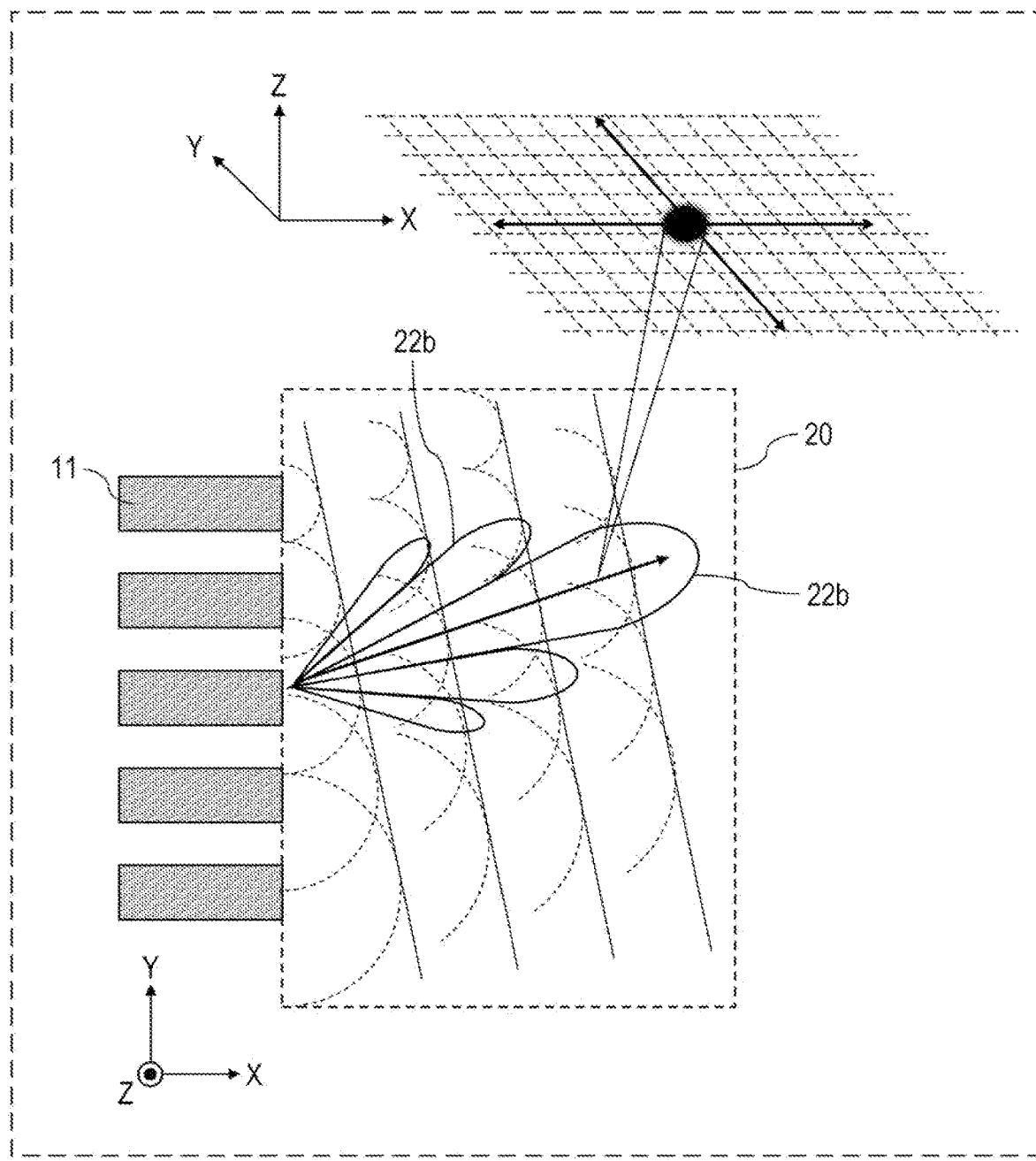
FIG. 10 schematically illustrates light being emitted from the optical device illustrated in FIG. 9A.

FIG. 10 schematically illustrates light being emitted from the optical device 100 illustrated in FIG. 9A. Unlike in the example illustrated in FIG. 7, light rays input from the optical waveguides 11 and propagating within the optical waveguide layer 20 interfere with each other within the optical waveguide layer 20 to form light beams 22b. The dashed curved lines, the solid straight lines, and the solid closed curved lines are as previously described with reference to FIGS. 3A and 3B. The light beams 22b are emitted externally through the mirror 30, and propagate in a specific direction.

Figure 11A:
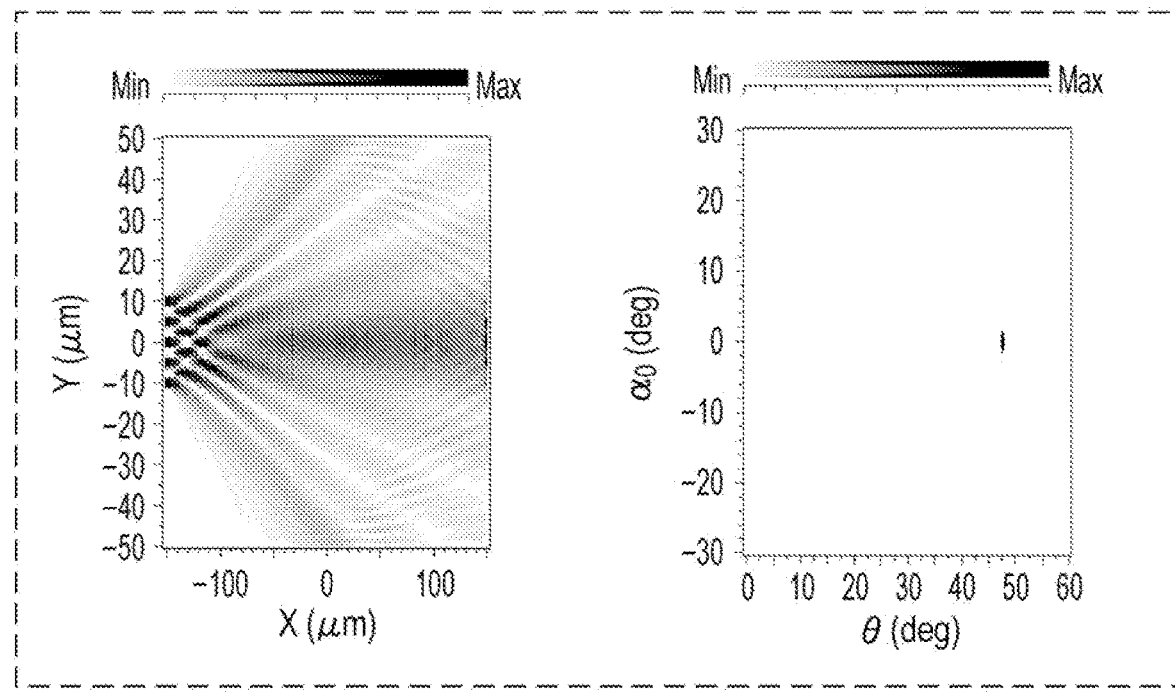
FIG. 11A illustrates, in accordance with Embodiment 1, an exemplary intensity distribution of light propagating between two mirrors, and an exemplary intensity distribution of light emitted to a distant location.
Figure 11B:
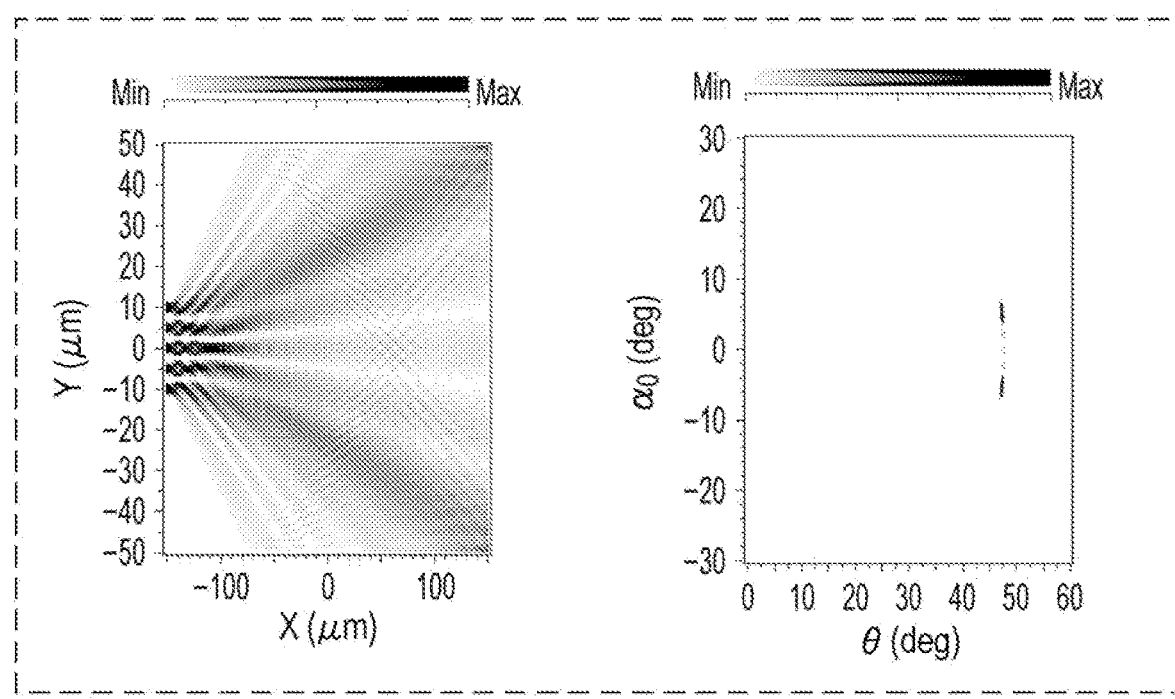
FIG. 11B illustrates, in accordance with Embodiment 1, an exemplary intensity distribution of light propagating between two mirrors, and an exemplary intensity distribution of light emitted to a distant location.
Figure 11C:
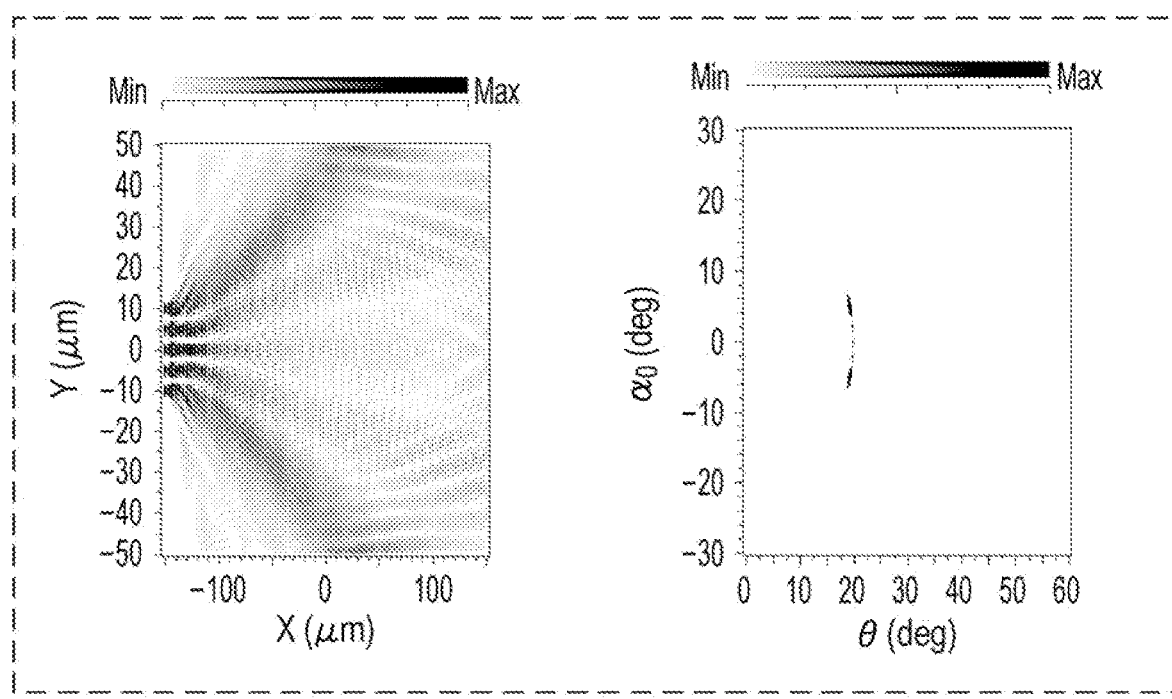
FIG. 11C illustrates, in accordance with Embodiment 1, an exemplary intensity distribution of light propagating between two mirrors, and an exemplary intensity distribution of light emitted to a distant location.

FIGS. 11A to 11C each illustrate, in accordance with Embodiment 1, an exemplary intensity distribution of light that propagates between the mirror 30 and the mirror 40, and an exemplary intensity distribution of light emitted to a distant location. The left graphs, the right graphs, and the calculation method used are as previously described. In the examples illustrated in FIGS. 11A to 11C, the optical waveguide layer 20 has a thickness of 2.13 μm.

In the example illustrated in FIG. 11A, the optical waveguide layer 20 has a refractive index n1=1.68. As illustrated in the left graph of FIG. 11A, light beams are formed in the +X direction within the optical waveguide layer 20. Increased light beam intensity is observed in the vicinity of Y=0, which corresponds to the location at the center of the middle one of the optical waveguides 11. Side lobes are formed in the vicinity of the main lobe. Light beams propagate within the optical waveguide layer 20 in the X direction. The far-field pattern illustrated in the right graph of FIG. 11A is similar to the field pattern illustrated in the right graph of FIG. 8A. However, as illustrated in the right graph of FIG. 11A, the ±1st order diffracted light has a comparatively low intensity.

In the example illustrated in FIG. 11B, unlike in the example illustrated in FIG. 11A, light rays propagating in the optical waveguides are each phase-shifted by π in the +Y direction. In the left graph of FIG. 11B, in comparison to the left graph of FIG. 11A, increased light beam intensity is observed in two directions. One of the two directions includes a component in the +X direction and a component in the +Y direction, and the other direction includes a component in the +X direction and a component in the −Y direction. As illustrated in the right graph of FIG. 11B, the far-field pattern also exhibits increased intensity in two directions. This means that due to the phase difference between input light rays, the Y direction component of light emitted through the mirror 30 has changed. The far-field pattern illustrated in the right graph of FIG. 11B is similar to the field pattern illustrated in the right graph of FIG. 8B.

In the example illustrated in FIG. 11C, unlike in the example illustrated in FIG. 11B, the optical waveguide layer 20 has a refractive index n1=1.52. In the left graph of FIG. 11C, in comparison to the left graph of FIG. 11B, light beams shift in the −X direction. In the right graph of FIG. 11C, in comparison to the right graph of FIG. 11B, the far-field pattern changes in a direction in which the angle of emission θ decreases. The far-field pattern illustrated in the right graph of FIG. 11C is similar to the field pattern illustrated in the right graph of FIG. 8C.

The foregoing discussion clarifies that the optical device 100 according to Embodiment 1 also makes it possible to achieve two-dimensional scanning in a manner similar to the optical device 99 according to the comparative example. The optical device 100 according to Embodiment 1 does not require plural waveguide elements 10, and therefore allows for easy fabrication.

Reference is now made to crosstalk between light rays propagating in the optical waveguides 11. In the example illustrated in FIG. 9A, the optical waveguides 11 are arranged periodically at equal intervals in the Y direction. As light propagates within each optical waveguide 11 in the X direction, evanescent light seeps out of the optical waveguide 11 in the Y direction. If two adjacent optical waveguides have a short center-to-center distance between each other, evanescent light seeping out of each optical waveguide may move to the adjacent optical waveguide. As a result, light rays propagating through the optical waveguides 11 may enter the optical waveguide layer 20 with no phase difference.

Figure 12:
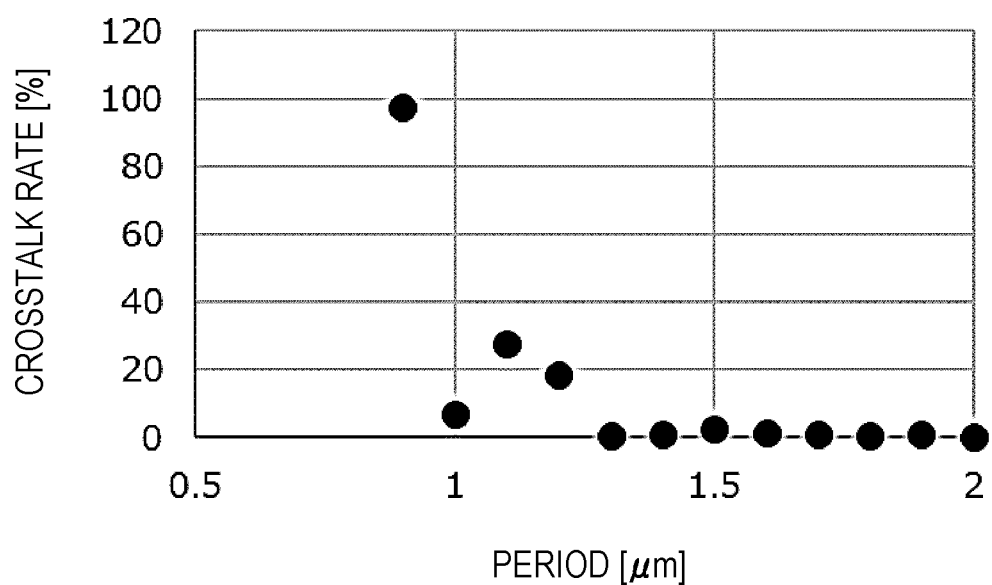
FIG. 12 illustrates the period dependency of the crosstalk rate between plural optical waveguides.

FIG. 12 illustrates the period dependency of the crosstalk rate between the optical waveguides 11 each having a length of 100 μm. The optical waveguides 11 each have a refractive index of 2.0, and the substrate 41 has a refractive index of 1.46. The optical waveguides 11 each have a width of 600 nm, and a height of 300 nm. As illustrated in FIG. 12, as the period between the optical waveguides 11 increases, the crosstalk rate decreases while oscillating. If the period is greater than or equal to 1.3 μm, the crosstalk rate can be made less than or equal to several percent.

Figure 13A:
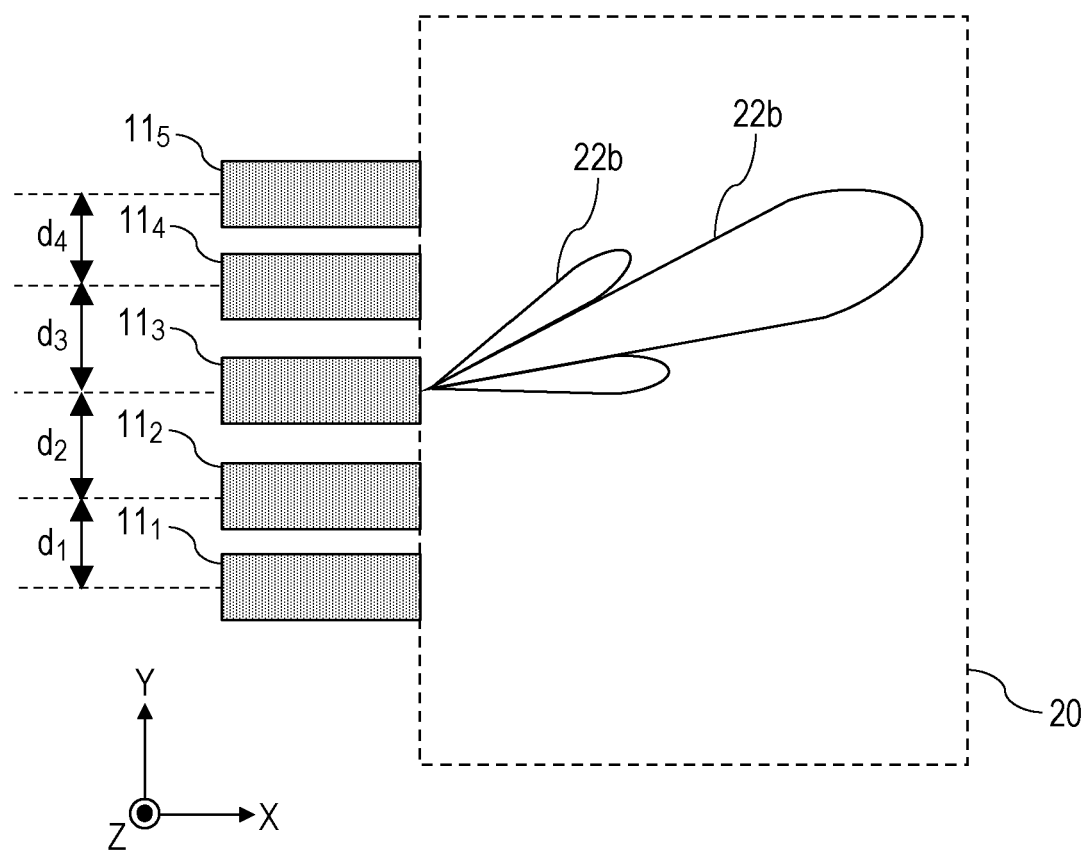
FIG. 13A schematically illustrates a first modification of the optical device according to Embodiment 1.
Figure 13B:
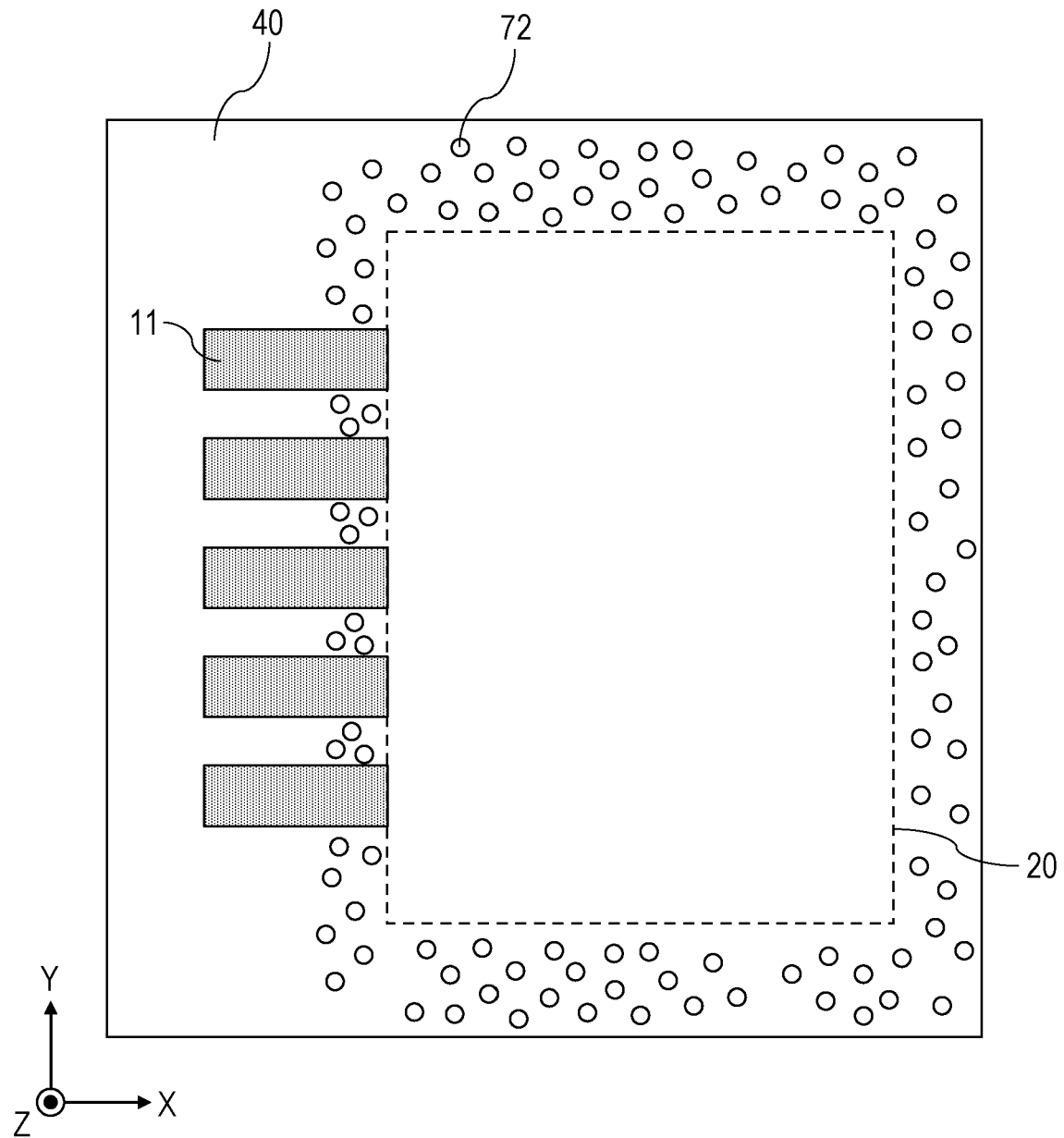
FIG. 13B schematically illustrates a second modification of the optical device according to Embodiment 1.

Reference is now made to FIGS. 13A and 13B to describe first and second modifications of the optical device 100 according to Embodiment 1. Description of features overlapping those of Embodiment 1 will be omitted in some cases.

FIG. 13A schematically illustrates a first modification of the optical device 100 according to Embodiment 1. Unlike in Embodiment 1, according to the first modification, plural optical waveguides 11 are not arranged at equal intervals in the Y direction. In the example illustrated in FIG. 13A, five optical waveguides 11 are referred to as "first optical waveguide $11_1$", "second optical waveguide $11_2$", "third optical waveguide $11_3$", "fourth optical waveguide $11_4$", and "fifth optical waveguide $11_5$" in order of their arrangement in the +Y direction. The first optical waveguide $11_1$ and the second optical waveguide $11_2$ have a first center-to-center distance $d_1$ between each other that is less than a second center-to-center distance $d_2$ between the second optical waveguide $11_2$ and the third optical waveguide $11_3$. The third optical waveguide $11_3$ and the fourth optical waveguide $11_4$ have a third center-to-center distance $d_3$ between each other that is equal to the second center-to-center distance $d_2$ between the second optical waveguide $11_2$ and the third optical waveguide $11_3$. The fourth optical waveguide $11_4$ and the fifth optical waveguide $11_5$ have a fourth center-to-center distance $d_4$ between each other that is equal to the first center-to-center distance $d_1$ between the first optical waveguide $11_1$ and the second optical waveguide $11_2$. That is, $d_2=d_3>d_1=d_4$. All of the spacings between the optical waveguides 11 may not necessarily be the same. Some of the spacings may be different. Appropriately designing the first to fourth center-to-center distances $d_1$ to $d_4$ makes it possible to suppress side lobes and grating lobes for the light beams 22b. This results in suppression of side lobes and grating lobes for light emitted through the mirror 30.

FIG. 13B schematically illustrates a second modification of the optical device 100 according to Embodiment 1. Unlike in Embodiment 1, according to the second modification, plural optical waveguides 11, the optical waveguide layer 20, and one or more elastic spacers 72 are disposed on the mirror 40. The one or more elastic spacers 72 are located around the respective distal end portions of the optical waveguides 11, and around the optical waveguide layer 20. The one or more elastic spacers 72 may each have the shape of a single continuous curve. The elastic spacers 72 each have a size in the Z direction that is greater than the size of each optical waveguide 11 in the Z direction and greater than the size of the optical waveguide layer 20 in the Z direction. The optical device 100 according to the second modification is fabricated by bonding the mirror 30 and the mirror 40 together such that at least part of the elastic spacers 72, and the optical waveguide layer 20 are located between the two mirrors.

If no elastic spacers 72 are present, as the mirror 30 is bonded to the mirror 40, the mirror 30 may come into contact first with a portion of a component disposed on the mirror 40. This may cause the mirror 30 to tilt relative to the mirror 40 with the contacting portion of the mirror 30 serving as a pivot. As a result, the intensity of light emitted through the mirror 30 may decrease.

By contrast, if the elastic spacers 72 are present, the mirror 30 comes into contact first with the elastic spacers 72. As the elastic spacers 72 are compressed, the mirror 30 and the mirror 40 can be bonded together in such a way that ensures uniform spacing between the mirror 30 and the mirror 40. This helps to prevent or reduce a decrease in the intensity of light emitted through the mirror 30.

Embodiment 2

Reference is now made to FIGS. 14A to 16B to describe an optical device according to Embodiment 2 of the present disclosure.

Figure 14A:
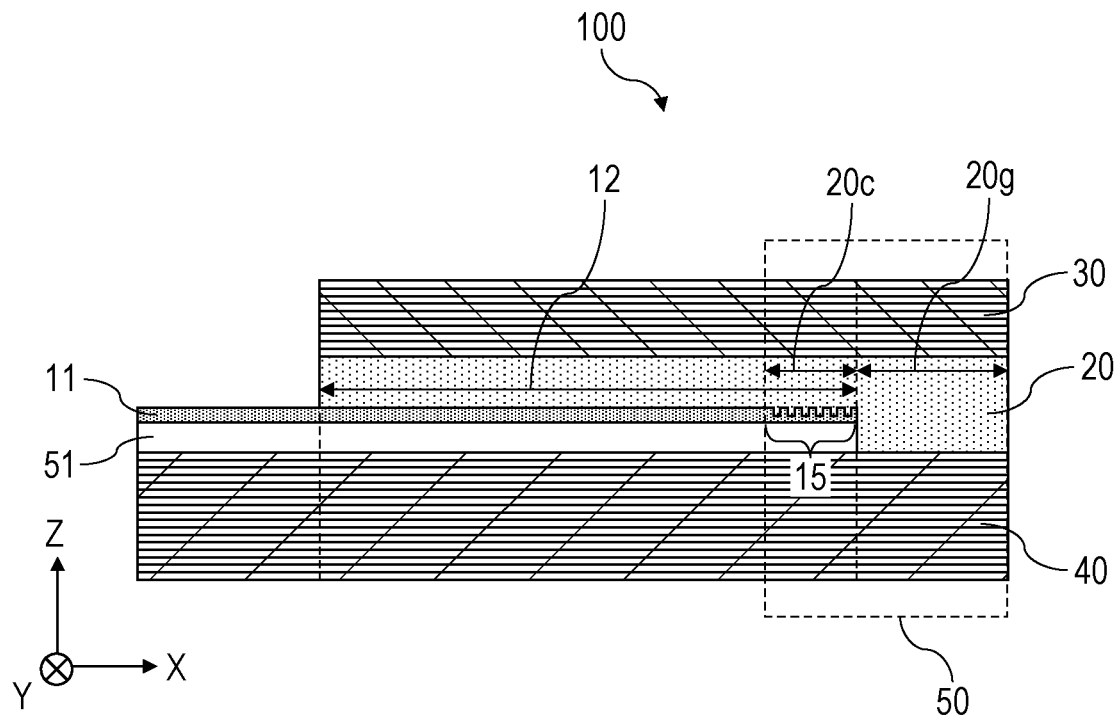
FIG. 14A is a schematic cross-sectional view along the X-Z plane of an exemplary optical device according to Embodiment 2.
Figure 14B:
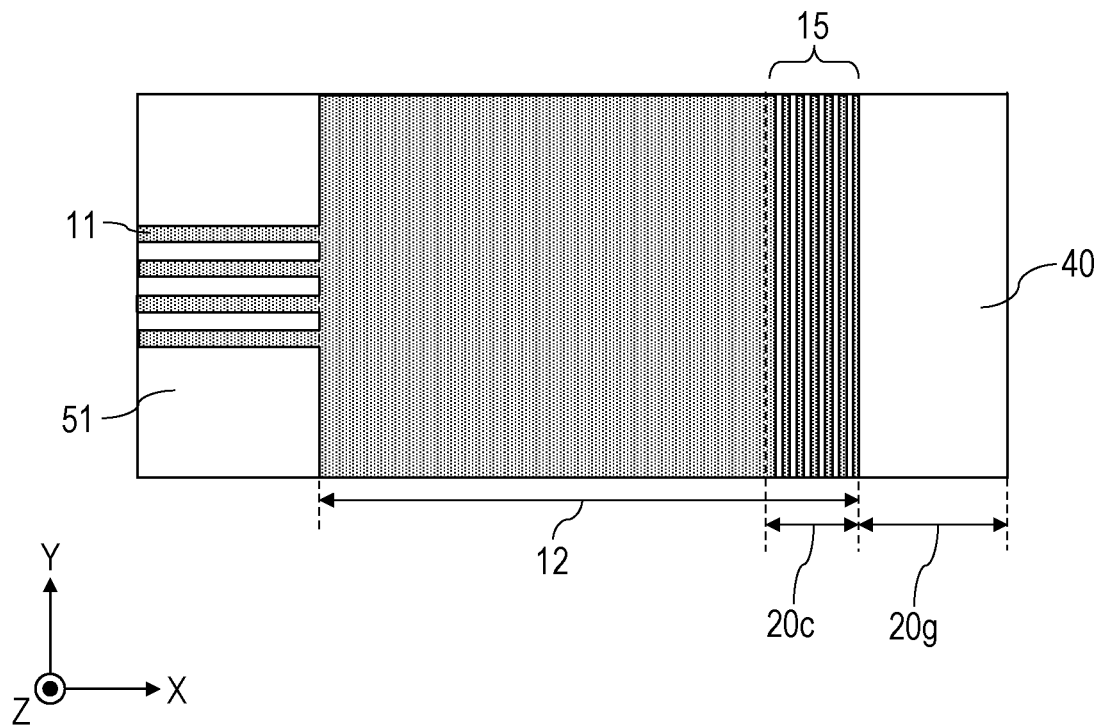
FIG. 14B is a schematic cross-sectional view along the X-Y plane of an exemplary optical device according to Embodiment 2.

FIGS. 14A and 14B are schematic cross-sectional views, respectively taken along the X-Z plane and the X-Y plane, of an example of the optical device 100 according to Embodiment 2. In the example illustrated in each of FIGS. 14A and 14B, another planar optical waveguide 12 is located between plural optical waveguides 11 and the planar optical waveguide 50. In other words, the planar optical waveguide 50 is connected with the optical waveguides 11 indirectly via the planar optical waveguide 12. The optical waveguides 11 branch off from the planar optical waveguide 12.

The mirror 40 is also located under the optical waveguides 11 and the planar optical waveguide 12. The optical waveguides 11 and the planar optical waveguide 12 are disposed over the mirror 40 with a cladding 51 interposed therebetween. The optical waveguides 11 each have a refractive index higher than the refractive index of the cladding 51. The planar optical waveguide 12 has a refractive index higher than the refractive index of the cladding 51. The optical waveguides 11 are arranged in the Y direction. The cladding 51 has a structure parallel to the X-Y plane. The cladding 51 may be removed in areas where the optical waveguides 11 and the planar optical waveguide 12 are not located over the cladding 51. The optical waveguide layer 20 and the mirror 30 that are located over the planar optical waveguide 12 may not necessarily be required.

The optical waveguide layer 20 includes an optical coupling portion 20c, and an optical waveguide portion 20g. The optical coupling portion 20c contains the distal end portion of the planar optical waveguide 12. The optical waveguide portion 20g is adjacent to the optical coupling portion 20c. The distal end portion of the planar optical waveguide 12 is located between the mirror 30 and the mirror 40. Light propagating from each of the optical waveguides 11 into the planar optical waveguide 12 couples to the optical waveguide portion 20g via the optical coupling portion 20c.

The distal end portion of the planar optical waveguide 12 is provided with a grating 15. The grating 15 includes plural depressions and/or projections. The number of the depressions and/or projections is greater than or equal to 4 and less than or equal to 64. Appropriately designing the period of the grating 15 makes it possible to compensate for the difference between the propagation constant for light propagating in the planar optical waveguide 12, and the propagation constant for light propagating in the optical waveguide layer 20. This compensation allows for efficient coupling of light from the planar optical waveguide 12 to the optical waveguide layer 20.

Figure 15:
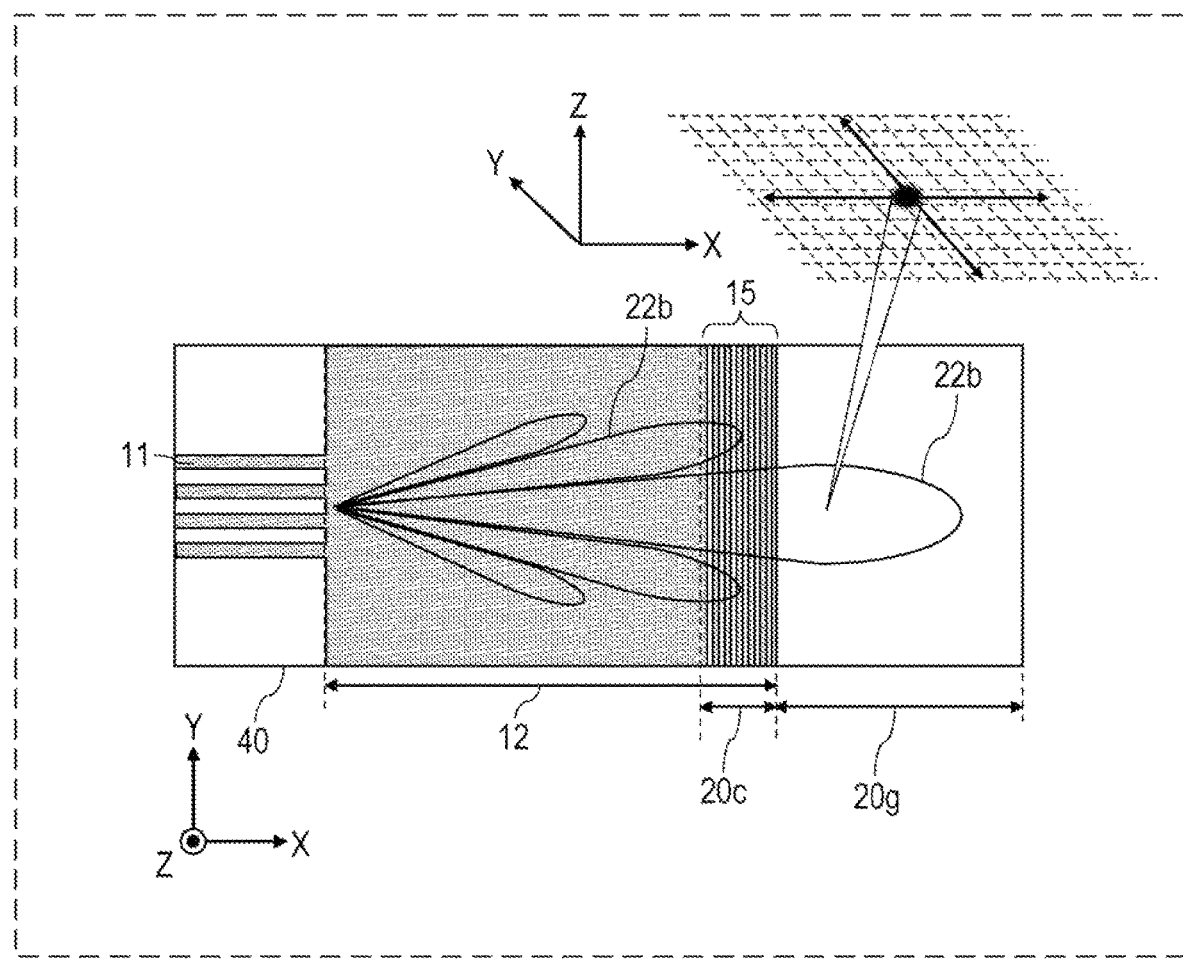
FIG. 15 schematically illustrates light beams being emitted from the optical device illustrated in FIGS. 14A and 14B.

FIG. 15 schematically illustrates light beams being emitted from the optical device 100 illustrated in FIGS. 14A and 14B. Light rays propagating through the optical waveguides 11 in the X direction interfere with each other within the planar optical waveguide 12 to form the light beams 22b. The light beams 22b are emitted externally through the mirror 30 from the optical waveguide portion 20g of the optical waveguide layer 20, and propagate in a specific direction.

Figure 16A:
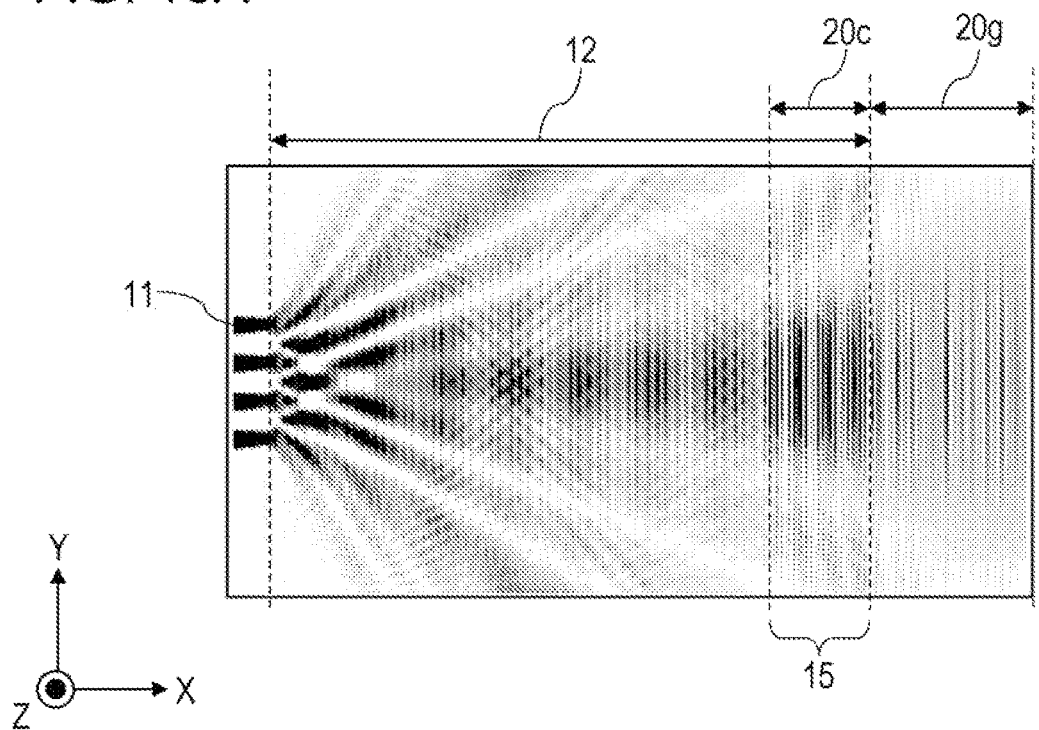
FIG. 16A illustrates the intensity distribution in the X-Y plane of light propagating between two mirrors.
Figure 16B:
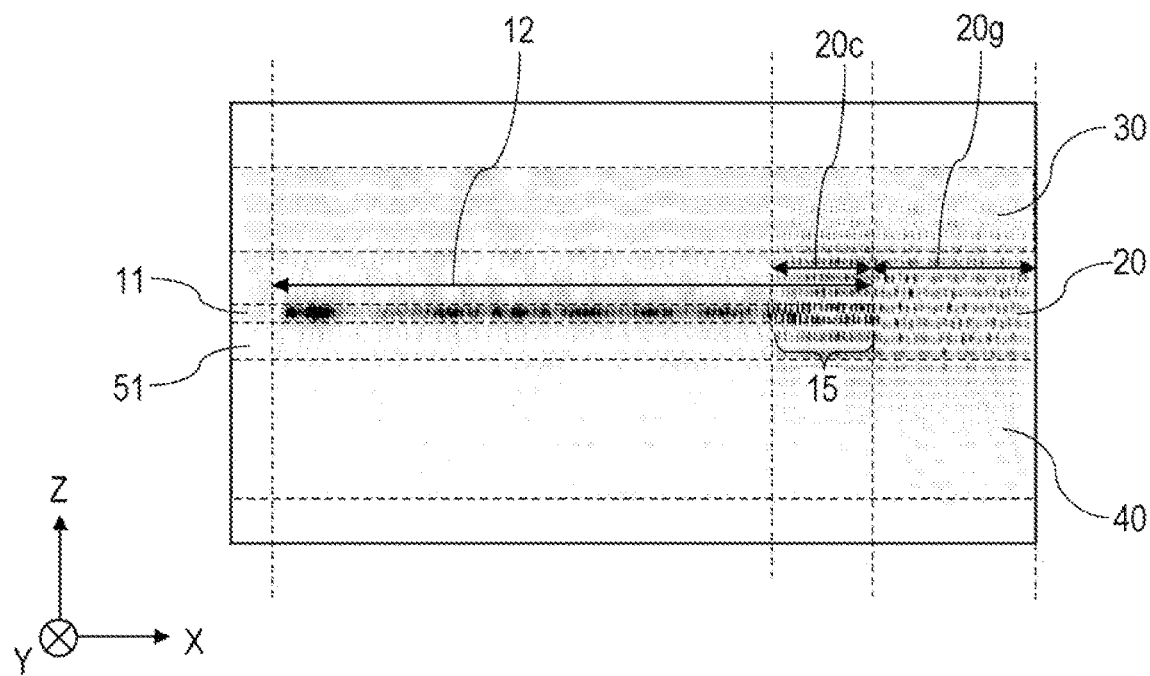
FIG. 16B illustrates the intensity distribution in the X-Z plane of light propagating between two mirrors.

FIGS. 16A and 16B respectively illustrate the intensity distributions in the X-Y and X-Z planes of light that propagates between the mirror 30 and the mirror 40. The method used to calculate the intensity distributions is as previously described. In the example illustrated in each of FIGS. 16A and 16B, the refractive index of the optical waveguides 11 is 2.115, the width of the optical waveguides 11 is 600 nm, the number of the optical waveguides 11 is four, and the period of the optical waveguides 11 is 1.8 µm. The cladding 51 has a refractive index of 1.46. The planar optical waveguide 12 has a refractive index of 2.115. The optical waveguide layer 20 has a refractive index of 1.61, and a thickness of 2.13 µm. Light rays propagating in the optical waveguides 11 are all equal in phase.

As illustrated in FIG. 16A, light beams are formed within the planar optical waveguide 12. As illustrated in FIG. 16B, the light beams formed within the planar optical waveguide 12 propagate via the grating 15 into the optical waveguide portion 20g.

In the example illustrated in FIG. 14A, in the optical waveguide layer 20, the refractive index and/or thickness of the optical coupling portion 20c, and the refractive index and/or thickness of the optical waveguide portion 20g may be adjusted individually. Such individual adjustment makes it possible to change the direction of light emitted through the mirror 30 while maintaining efficient coupling of light from the optical waveguides 11 to the optical waveguide layer 20.

Instead of Embodiment 2, in Embodiment 1, the optical waveguide layer 20 of the planar optical waveguide 50 may include an optical coupling portion that contains the respective distal end portions of the optical waveguides 11, and an optical waveguide portion that is adjacent to the optical coupling portion. The distal end portion of each of the optical waveguides 11 may include one or more gratings. The above-mentioned configuration allows for efficient coupling of light from the optical waveguides 11 to the optical waveguide layer 20.

The first and second modifications employed for Embodiment 1 can be also employed for Embodiment 2.

(Configuration for Driving Planar Optical Waveguide 50)

Figure 17A:
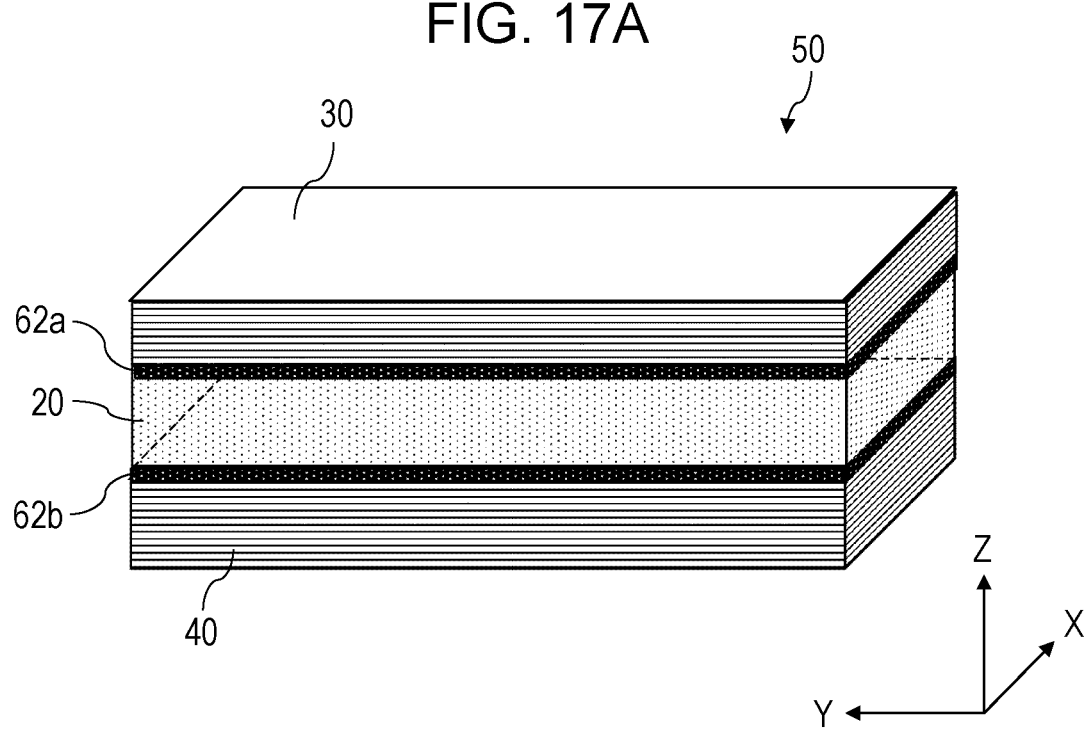
FIG. 17A schematically illustrates a first exemplary configuration for driving a planar optical waveguide.
Figure 17B:
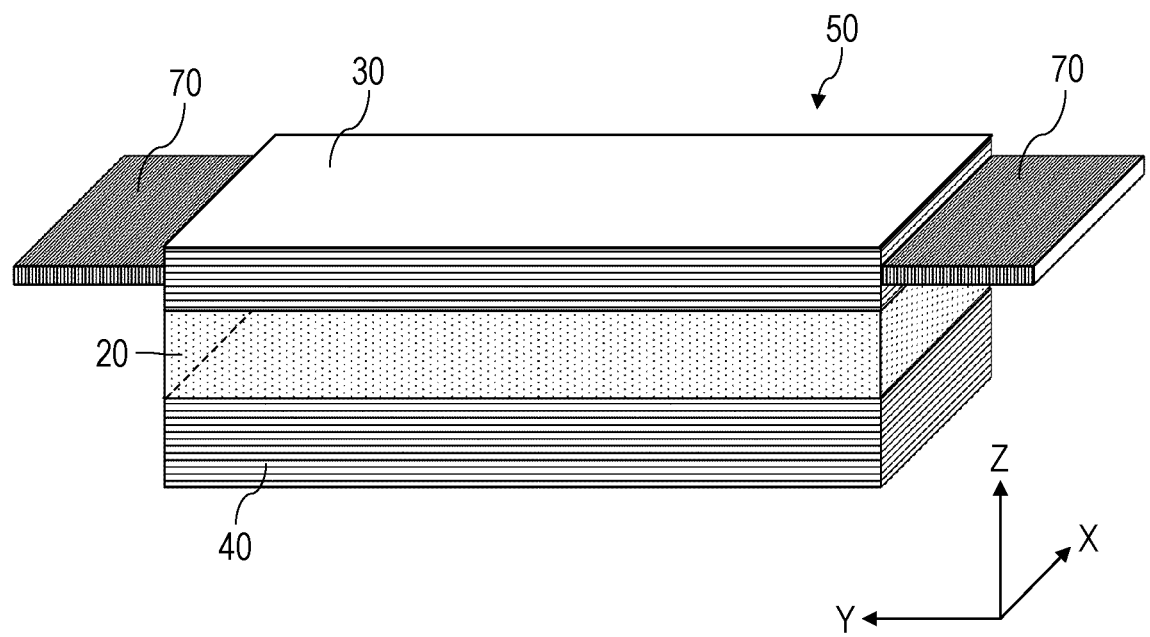
FIG. 17B schematically illustrates a second exemplary configuration for driving a planar optical waveguide.

Reference is now made to FIGS. 17A and 17B to describe a configuration for driving the planar optical waveguide 50.

FIG. 17A schematically illustrates a first exemplary configuration for driving the planar optical waveguide 50. In the example illustrated in FIG. 17A, the planar optical waveguide 50 includes a first electrode 62a disposed between the optical waveguide layer 20 and the mirror 30, and a second electrode 62b disposed between the optical waveguide layer 20 and the mirror 40. The first electrode 62a may be, for example, a transparent electrode. Light that propagates within the optical waveguide layer 20 is emitted externally via the first electrode 62a and the mirror 30. The second electrode 62b may be, for example, a transparent electrode, or an electrode made of metal. The optical waveguide layer 20 may include, for example, a liquid crystal material or an electro-optic material. The optical waveguide layer 20 is located between a pair of electrodes including the first electrode 62a and the second electrode 62b. The first drive circuit described above applies voltage to the pair of electrodes to thereby change the refractive index of the optical waveguide layer 20.

FIG. 17B schematically illustrates a second exemplary configuration for driving the planar optical waveguide 50. In the example illustrated in FIG. 17B, the planar optical waveguide 50 further includes a pair of actuators 70 to support the mirror 30. The pair of actuators 70 may support the mirror 40 instead of the mirror 30, or may support the mirror 30 and the mirror 40. The optical waveguide layer 20 may include, for example, a deformable liquid or gas. The pair of actuators 70 may utilize, for example, electrostatic force, electromagnetic induction, a piezoelectric material, a shape-memory alloy, or heat. By changing the spacing between the mirror 30 and the mirror 40 by means of the pair of actuators 70, the thickness of the optical waveguide layer 20 is changed. The first drive circuit described above causes the thickness of the optical waveguide layer 20 to change by applying voltage to the pair of actuators 70 including, for example, a piezoelectric material.

As described above, changing the refractive index and/or thickness of the optical waveguide layer 20 makes it possible to change a component, parallel to the X direction, of light emitted through the mirror 30.

Exemplary Applications

Figure 18:
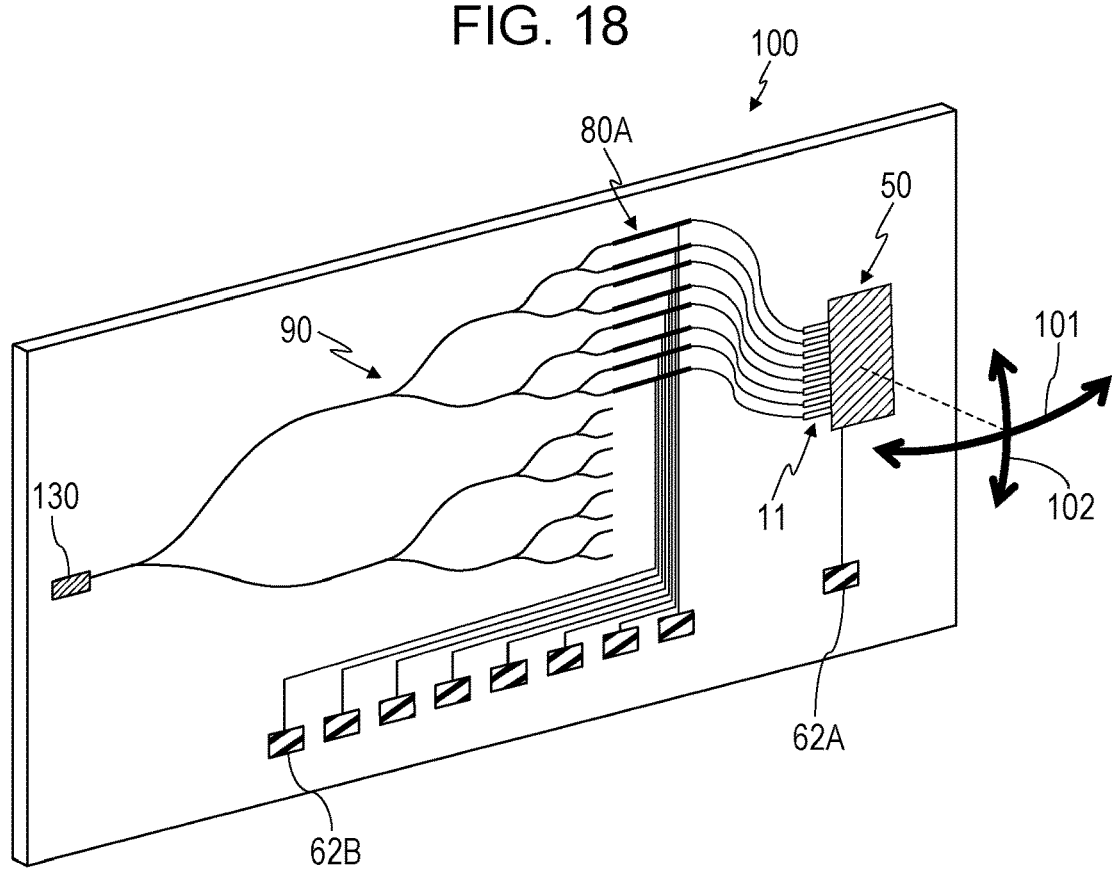
FIG. 18 illustrates an exemplary configuration of an optical scanning device with elements integrated on a circuit board.

FIG. 18 illustrates an exemplary configuration of the optical scanning device 100 including the following and other elements integrated on a circuit substrate (e.g., a chip): the planar optical waveguide 50, the optical waveguides 11, the optical divider 90, the phase shifter array 80A, and a light source 130. The light source 130 may be, for example, a light-emitting element such as a semiconductor laser. The light source 130 in this example emits single-wavelength light with a wavelength λ in free space. The optical divider 90 divides the light from the light source 130 into branches that are introduced into the respective waveguides of the corresponding phase shifters. In the example illustrated in FIG. 18, an electrode 62A, and plural electrodes 62B are disposed on the chip. A control signal is supplied to the planar optical waveguide 50 from the electrode 62A. A control signal is sent from each of the electrodes 62B to the corresponding one of the phase shifters 80 in the phase shifter array 80A. The electrode 62A and the electrodes 62B may be connected with a control circuit (not illustrated) that generates the above-mentioned control signal. The control circuit may be disposed on the chip illustrated in FIG. 18, or may be disposed on another chip of the optical scanning device 100.

As illustrated in FIG. 18, integrating all the components on a chip makes it possible to achieve optical scanning over a wide range by means of a compact device. For example, all the components can be integrated on a chip measuring about 2 mm by 1 mm.

Figure 19:
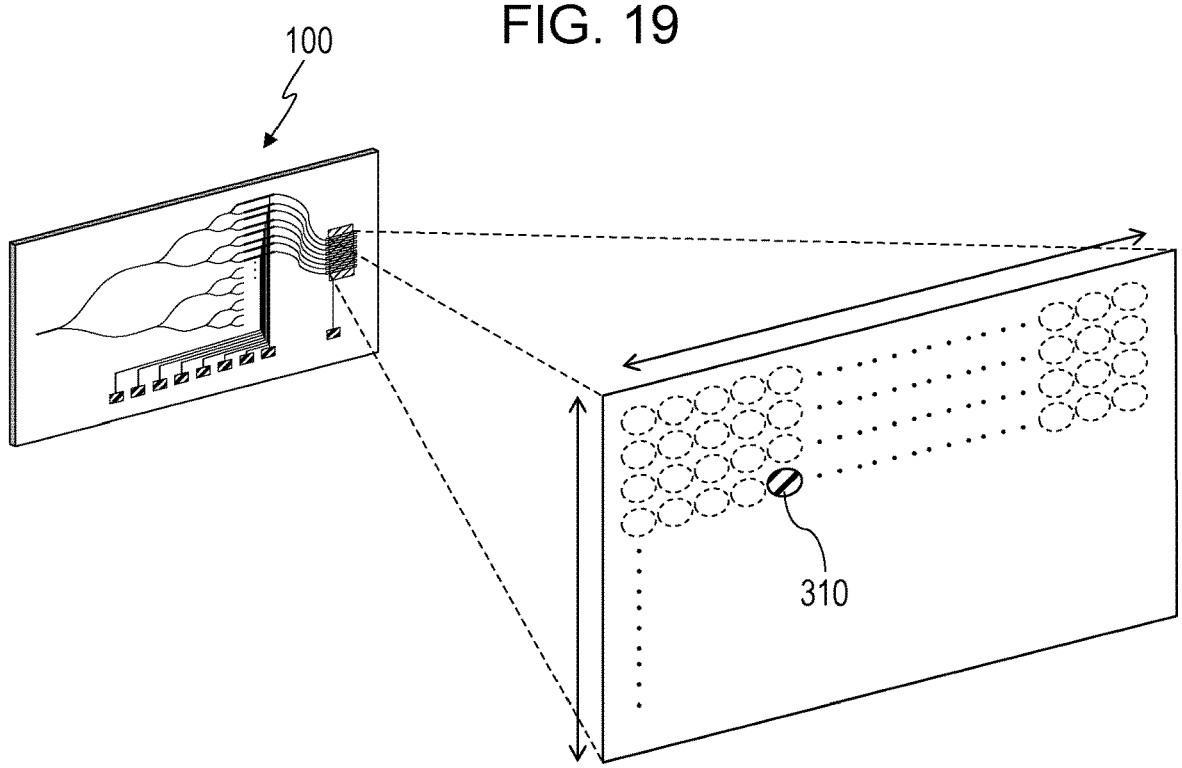
FIG. 19 schematically illustrates two-dimensional scanning that is being executed by radiating beams of light such as laser beams from an optical scanning device to a distant location.

FIG. 19 schematically illustrates two-dimensional scanning that is being executed by radiating beams of light such as laser beams from the optical scanning device 100 to a distant location. The two-dimensional scanning is executed by moving a beam spot 310 in the horizontal and vertical directions. For example, using the optical scanning in combination with the known Time of Flight (TOF) method, a two-dimensional ranging image can be obtained. The TOF method is a method that involves radiating laser light to a target object, and observing the reflection from the object to calculate the time of flight of the light and thereby determine the distance to the object.

Figure 20:
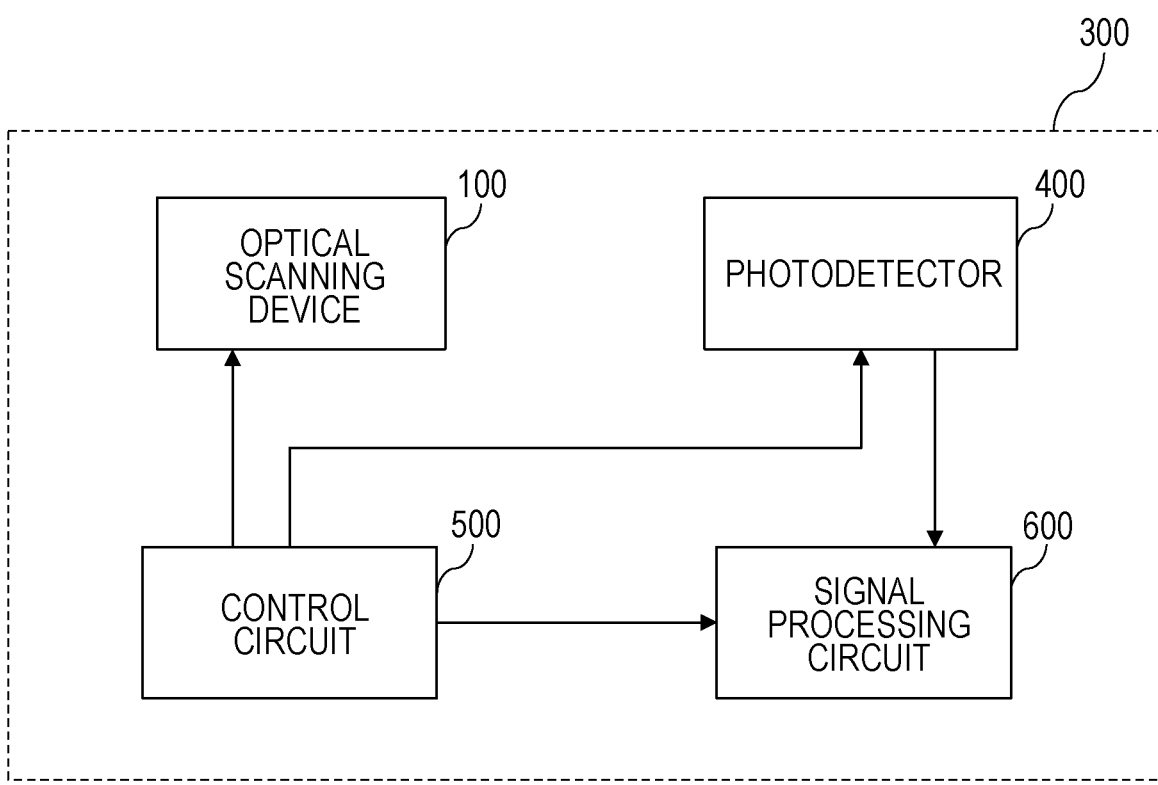
FIG. 20 is a block diagram illustrating an exemplary configuration of a LiDAR system.

FIG. 20 is a block diagram illustrating an exemplary configuration of a LiDAR system 300, which is an exemplary photodetection system capable of generating the above-mentioned ranging image. The LiDAR system 300 includes the optical scanning device 100, a photodetector 400, a signal processing circuit 600, and a control circuit 500. The photodetector 400 detects light emitted from the optical scanning device 100 and reflected by a target object. The photodetector 400 may be, for example, an image sensor with sensitivity to the wavelength λ of light emitted from the optical scanning device 100, or a photodetector including a light receiving element such as a photodiode. The photodetector 400 outputs an electrical signal corresponding to the amount of light received. The signal processing circuit 600 calculates the distance to the target object based on the electrical signal output from the photodetector 400, and generates distance distribution data. The distance distribution data represents a two-dimensional distribution of distance (i.e., a ranging image). The control circuit 500 is a processor that controls the optical scanning device 100, the photodetector 400, and the signal processing circuit 600. The control circuit 500 controls the timing of laser beam radiation from the optical scanning device 100 and the timing of exposure and signal readout of the photodetector 400, and instructs the signal processing circuit 600 to generate a ranging image.

In two-dimensional scanning, the frame rate used for acquiring ranging images can be selected from among, for example, frame rates commonly used for moving images, such as 60 fps, 50 fps, 30 fps, 25 fps, and 24 fps. From the viewpoint of applications to in-vehicle systems, the higher the frame rate, the higher the frequency of ranging image acquisition, and the higher the precision of obstacle detection. For example, for a vehicle travelling at 60 km/h, a frame rate of 60 fps allows an image to be acquired each time the vehicle moves about 28 cm. A frame rate of 120 fps allows an image to be acquired each time the vehicle moves about 14 cm. A frame rate of 180 fps allows an image to be acquired each time the vehicle moves about 9.3 cm.

The time required to acquire one ranging image depends on the speed of beam scanning. For example, to acquire an image with 100×100 resolvable spots at 60 fps, each spot needs to be beam-scanned in an amount of time less than or equal to 1.67 μs. In this case, the control circuit 500 controls, at an operating speed of 600 kHz, the emission of light beams by the optical scanning device 100, and the accumulation/readout of signals by the photodetector 400.

<Exemplary Application to Optical Receiver Device>

Each of the optical scanning devices according to the above-mentioned embodiments of the present disclosure can be also used as an optical receiver device with substantially the same configuration. The optical receiver device includes the planar optical waveguide 50 and plural optical waveguides 11, which are identical to those of the optical scanning device, and a first adjustment element that adjusts the direction of light that can be received. The first mirror 30 transmits light that is incident in the third direction on a side of the first mirror 30 opposite to the first reflecting surface. The optical waveguide layer 20 allows light transmitted through the first mirror 30 to propagate in the second direction. The direction of light that can be received can be changed by the first adjustment element changing at least one of the refractive index of the optical waveguide layer 20, the thickness of the optical waveguide layer 20, or the wavelength of light. Further, the direction of light that can be received can be changed two-dimensionally if the optical receiver device includes plural phase shifters 80 identical to those of the optical scanning device, and a second adjustment element that changes the relative phase difference between individual light rays output through the phase shifters 80.

For example, by replacing the light source 130 of the optical scanning device 100 illustrated in FIG. 18 by a receiver circuit, the optical scanning device 100 can be used as an optical receiver device. When light with a wavelength λ enters the planar optical waveguide 50, rays of the incident light are sent to the optical divider 90 through the phase shifter array 80A, and combined at a single location before being sent to the receiving circuit. The intensity of the light rays combined at the single location can be said to represent the sensitivity of the optical receiver device. The sensitivity of the optical receiver device can be adjusted by adjustment elements individually incorporated into the planar optical waveguide 50 and the phase shifter array 80A.

The above-mentioned embodiments may be suitably combined with each other.

The optical scanning device and the optical receiver device according to embodiments of the present disclosure can be used for applications including, for example, LiDAR systems installed in vehicles such as automobiles, UAVs, and AGVs.

What is claimed is:

1. An optical device comprising:
a plurality of optical waveguides that each extend in a first direction, and are arranged in a second direction intersecting the first direction; and
a planar optical waveguide connected directly or indirectly with the plurality of optical waveguides, wherein:
the plurality of optical waveguides each allow light to propagate in the first direction, and
the planar optical waveguide is a single planar waveguide, and includes:
a first mirror and a second mirror that face each other, and extend in the first direction and the second direction, and
an optical waveguide layer located between the first mirror and the second mirror.

2. The optical device according to claim 1, further comprising
at least one of an electrode causing the optical waveguide layer to change in refractive index, or an actuator causing the optical waveguide layer to change in thickness.

3. The optical device according to claim 1, further comprising
an other optical waveguide disposed between the plurality of optical waveguides and the planar optical waveguide,
wherein the plurality of optical waveguides branch off from the other optical waveguide.

4. The optical device according to claim 3, wherein:
the optical waveguide layer of the planar optical waveguide includes an optical coupling portion and an optical waveguide portion,
the optical coupling portion comprises a distal end portion of the other optical waveguide, the optical waveguide portion being adjacent to the optical coupling portion, and
the distal end portion of the other optical waveguide includes one or more gratings.

5. The optical device according to claim 1, wherein:
the optical waveguide layer of the planar optical waveguide includes an optical coupling portion and an optical waveguide portion,
the optical coupling portion comprises a distal end portion of each of the plurality of optical waveguides, the optical waveguide portion being adjacent to the optical coupling portion, and
the distal end portion of each of the plurality of optical waveguides includes one or more gratings.

6. The optical device according to claim 5,
wherein a refractive index and/or thickness of the optical coupling portion of the optical waveguide layer, and a refractive index and/or thickness of the optical waveguide portion of the optical waveguide layer can be adjusted individually.

7. The optical device according to claim 1,
wherein the plurality of optical waveguides are arranged at equal intervals in the second direction.

8. The optical device according to claim 1, wherein:
the plurality of optical waveguides include a first optical waveguide, a second optical waveguide, and a third optical waveguide that are arranged sequentially in the second direction in an order of the first optical waveguide, the second optical waveguide, and the third optical waveguide, and
a center-to-center distance between the first optical waveguide and the second optical waveguide is different from a center-to-center distance between the second optical waveguide and the third optical waveguide.

9. The optical device according to claim 1, further comprising
a phase shifter that changes a phase difference between rays of the light that each propagate in each of the plurality of optical waveguides.

10. A photodetection system comprising:
the optical device according to claim 1;
a photodetector that detects light emitted from the optical device and reflected by a target object; and
a signal processing circuit that, based on an output of the photodetector, generates distance distribution data.

11. The optical device according to claim 1, wherein the optical waveguide layer of the planar optical waveguide receives the light from each of the plurality of optical waveguides.

12. An optical device comprising:
a plurality of optical waveguides that each extend in a first direction, and are arranged in a second direction intersecting the first direction; and
a planar optical waveguide connected directly or indirectly with the plurality of optical waveguides, wherein:
the plurality of optical waveguides each allow light to propagate in the first direction,
the planar optical waveguide includes:
    a first mirror and a second mirror that face each other, and extend in the first direction and the second direction, and
    an optical waveguide layer located between the first mirror and the second mirror,
the optical waveguide layer of the planar optical waveguide includes an optical coupling portion and an optical waveguide portion,
the optical coupling portion comprises a distal end portion of each of the plurality of optical waveguides, the optical waveguide portion being adjacent to the optical coupling portion, and
the distal end portion of each of the plurality of optical waveguides includes one or more gratings.

13. The optical device according to claim 12, wherein a refractive index and/or thickness of the optical coupling portion of the optical waveguide layer, and a refractive index and/or thickness of the optical waveguide portion of the optical waveguide layer can be adjusted individually.

14. An optical device comprising:
a plurality of optical waveguides that each extend in a first direction, and are arranged in a second direction intersecting the first direction;
a planar optical waveguide connected directly or indirectly with the plurality of optical waveguides; and
an other optical waveguide disposed between the plurality of optical waveguides and the planar optical waveguide, wherein:
the plurality of optical waveguides each allow light to propagate in the first direction,
the planar optical waveguide includes:
    a first mirror and a second mirror that face each other, and extend in the first direction and the second direction, and
    an optical waveguide layer located between the first mirror and the second mirror,
the plurality of optical waveguides branch off from the other optical waveguide,
the optical waveguide layer of the planar optical waveguide includes an optical coupling portion and an optical waveguide portion,
the optical coupling portion comprises a distal end portion of the other optical waveguide, the optical waveguide portion being adjacent to the optical coupling portion, and
the distal end portion of the other optical waveguide includes one or more gratings.

\* \* \* \* \*